(12) United States Patent
Hong et al.

(10) Patent No.: US 11,677,945 B2
(45) Date of Patent: *Jun. 13, 2023

(54) GENERAL BLOCK PARTITIONING METHOD

(71) Applicant: ARRIS Enterprises LLC, Suwanee, GA (US)

(72) Inventors: Seungwook Hong, San Diego, CA (US); Krit Panusopone, San Diego, CA (US); Limin Wang, San Diego, CA (US); Yue Yu, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,203

(22) Filed: Feb. 24, 2022

(65) Prior Publication Data

US 2022/0182627 A1 Jun. 9, 2022

Related U.S. Application Data

(63) Continuation of application No. 16/867,351, filed on May 5, 2020, now Pat. No. 11,297,318, which is a
(Continued)

(51) Int. Cl.
*H04N 19/119* (2014.01)
*H04N 19/176* (2014.01)
(Continued)

(52) U.S. Cl.
CPC ......... *H04N 19/119* (2014.11); *H04N 19/107* (2014.11); *H04N 19/159* (2014.11);
(Continued)

(58) Field of Classification Search
CPC .. H04N 19/107; H04N 19/119; H04N 19/159; H04N 19/172; H04N 19/176; H04N 19/46; H04N 19/61; H04N 19/70
See application file for complete search history.

(56) References Cited

U.S. PATENT DOCUMENTS 10,326,989 B2 * 6/2019 Hong .................. H04N 19/70
10,674,149 B2 * 6/2020 Hong .................. H04N 19/107
(Continued)

FOREIGN PATENT DOCUMENTS

WO 2014/120367 A1 8/2014

OTHER PUBLICATIONS

H. Huang, et al., "EE2.1: Quadtree plus binary tree structure integration with JEM tools," JVET-C0024, May 2016.
(Continued)

*Primary Examiner* — Farzana Hossain
(74) *Attorney, Agent, or Firm* — Chernoff, Vilhauer, McClung & Stenzel, LLP

(57) ABSTRACT

A method of partitioning in video coding for JVET, comprising representing a JVET coding tree unit as a root node in a quadtree plus binary tree (QTBT structure that can have quadtree or binary partitioning of the root node and quadtree or binary trees branching from each of the leaf nodes. The partitioning at any depth can use asymmetric binary partitioning to split a child node represented by a leaf node into two child coding units of unequal size, representing the two child coding units as leaf nodes in a binary tree branching from the parent leaf node and coding the child coding units represented by final leaf nodes of the binary tree with JVET. Disclosed is a generalized method of partitioning a block, either square or rectangular, which leads to more flexible block sizes with possible higher coding efficiency.

2 Claims, 17 Drawing Sheets

Related U.S. Application Data continuation of application No. 16/396,327, filed on Apr. 26, 2019, now Pat. No. 10,674,149, which is a continuation of application No. 15/605,895, filed on May 25, 2017, now Pat. No. 10,326,989.

(60) Provisional application No. 62/419,795, filed on Nov. 9, 2016, provisional application No. 62/341,325, filed on May 25, 2016.

(51) Int. Cl.
    *H04N 19/70*   (2014.01)
    *H04N 19/172*  (2014.01)
    *H04N 19/46*   (2014.01)
    *H04N 19/107*  (2014.01)
    *H04N 19/159*  (2014.01)
    *H04N 19/61*   (2014.01)

(52) U.S. Cl.
    CPC ......... *H04N 19/172* (2014.11); *H04N 19/176* (2014.11); *H04N 19/46* (2014.11); *H04N 19/70* (2014.11); *H04N 19/61* (2014.11)

(56) References Cited

U.S. PATENT DOCUMENTS

| | | | |
|---|---|---|---|
| 11,297,318 B2* | 4/2022 | Hong | H04N 19/107 |
| 2011/0134998 A1 | 6/2011 | Lee et al. | |
| 2017/0094314 A1 | 3/2017 | Zhao et al. | |
| 2017/0195671 A1 | 7/2017 | Choi | |
| 2017/0272750 A1 | 9/2017 | An et al. | |
| 2017/0347095 A1 | 11/2017 | Panusopone et al. | |
| 2017/0347123 A1 | 11/2017 | Panusopone et al. | |
| 2017/0347128 A1 | 11/2017 | Panusopone et al. | |
| 2018/0109812 A1 | 4/2018 | Tsai et al. | |
| 2018/0213264 A1 | 7/2018 | Zhang et al. | |

OTHER PUBLICATIONS

M.T. Pourazad, et al., "HEVC: The New Gold Standard for Video Compression: How Does HEVC Compare with H.264/AVC?", IEEE Consumer Electronics Magazine, vol. 1, No. 3, Jul. 1, 2012., section "Variable PU size motion compensation" and Fig. 10 on p. 41.

J. Chen, et al., "Algorithm Description of Joint Exploration Test Model 1", 1st JVET Meeting, Oct. 19-21, 2015, Geneva (the Joint Video Exploration Team of ISO/IEC JTC1/SC29/WG11 and ITU-T SG.16, Feb. 24, 2016, section 2.2 Quadtree plus binary tree (QTBT) block structure.

H. Samet, et al., "Efficient Component Labeling of Images of Arbitrary Dimension Represented by Linear Bintrees", IEEE Transactions on Pattern Analysis and Machine Intelligence, IEEE Computer Society, vol. 10, No. 4, Jul. 1, 1998, pp. 579-586.

F. Le Leannec, et al., "Asymmetric Coding Units in QTBT", 4th JVET Meeting, Oct. 15-21, 2016, Chengdu (the Joint Video Exploration Team of ISO/IEC JTC1/SC29/WG11 and ITU-T SG.16, Oct. 5, 2016.

G.J. Sullivan, et al., "Meeting Report of the 4th JVET Meeting, Oct. 15-21, 2016, Chendu (the Joint Video Exploration Team of ISO/IEC JTC1/SC29/WG11 and ITU-T SG.16, Jan. 12, 2017, section 6.4.2 Other partitioning schemes (4)", p. 57.

J. An, et al., "Block partitioning structure for next generation video coding," MPEG doc. m37524 and ITU-T SG16 Doc. COM16-C966, Sep. 2015.

J. An, et al., "Quadtree plus binary tree structure integration with JEM tools", Joint Video Exploration Team (JVET) of ITU-T SG 16 WP 3 and ISO/IEC JTC 1/SC 29/WG 11, MediaTek, JVET-B0023, Feb. 2016.

E. Alshina, et al., "Description of Exploration Experiments on Coding Tools," JVET-B1011, Feb. 2016.

K. Suehring and X. Li, "JVET common test conditions and software reference configurations," JVET-B1010, Feb. 2016.

X. Li, et al., "Multi-Type-Tree," JVET-D0117.

J. Chen, et al., "Algorithm Description of Joint Exploration Test Model 5 (JEM 5)", JVET-E1001-V2.

* cited by examiner

BLOCK A

BLOCK A (a) Asymmetric Partitioning Type 1

(b) Asymmetric Partitioning Type 2

(c) Asymmetric Partitioning Type 3

(d) Asymmetric Partitioning Type 4

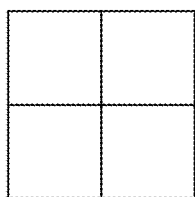
FIG. 5A
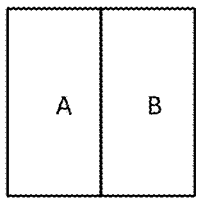
(a) Type 1
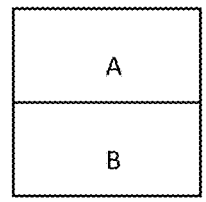
(b) Type 2
FIG. 5B
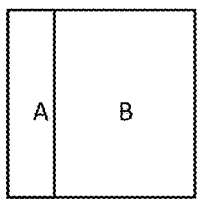
(a) Type 1
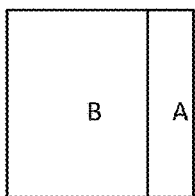
(b) Type 2
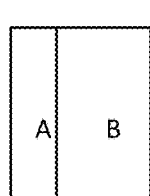
(a) Type 1
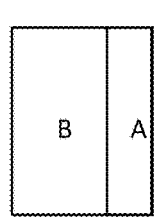
(b) Type 2
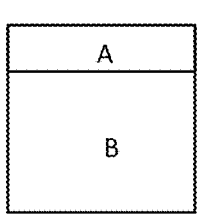
(c) Type 3
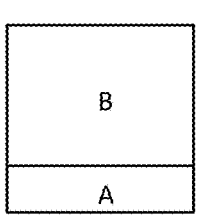
(d) Type 4
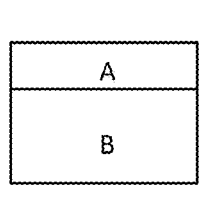
(c) Type 3
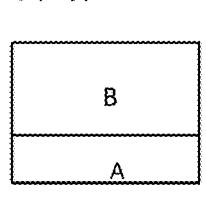
(d) Type 4
FIG. 5C
FIG. 5D
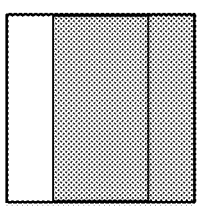
(a) Type 1
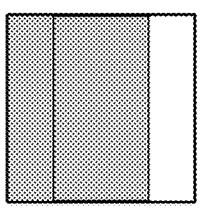
(b) Type 2
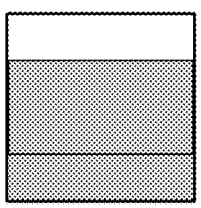
(c) Type 3
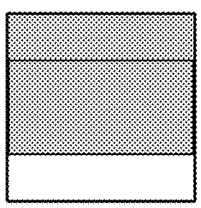
(d) Type 4
FIG. 5E

GENERAL BLOCK PARTITIONING METHOD

CLAIM OF PRIORITY

The present application is a continuation of U.S. patent application Ser. No. 16/867,351 filed May 5, 2020, which is a continuation of U.S. patent application Ser. No. 16/396,327 filed on Apr. 26, 2019, now U.S. Pat. No. 10,674,149, which is a continuation of U.S. patent application Ser. No. 15/605,895 filed on May 25, 2017 now U.S. Pat. No. 10,326,989, which claims priority under 35 U.S.C. § 119(e) from earlier filed U.S. Provisional Application Ser. No. 62/341,325, filed May 25, 2016, and from earlier filed U.S. Provisional Application Ser. No. 62/419,795, filed Nov. 9, 2016, all of which are hereby incorporated by reference.

TECHNICAL FIELD

The present disclosure relates to the field of video coding, particularly a block partitioning scheme for JVET for partitioning block, either square or rectangular, for video coding and the syntax structure that signals the partitioning structure representation.

BACKGROUND

The technical improvements in evolving video coding standards illustrate the trend of increasing coding efficiency to enable higher bit-rates, higher resolutions, and better video quality. The Joint Video Exploration Team is developing a new video coding scheme referred to as JVET. Similar to other video coding schemes like HEVC (High Efficiency Video Coding), JVET is a block-based hybrid spatial and temporal predictive coding scheme. However, relative to HEVC, JVET includes many modifications to bitstream structure, syntax, constraints, and mapping for the generation of decoded pictures. JVET has been implemented in Joint Exploration Model (JEM) encoders and decoders.

SUMMARY

The present disclosure provides a method of partitioning a video coding block for JVET, the method comprising receiving a bitstream indicating how a coding tree unit was partitioned into coding units according to a quadtree plus binary tree (QTBT) structure that allows quadtree nodes to be split with quadtree partitioning, symmetric binary partitioning, or asymmetric binary partitioning, parsing said bitstream to determine a syntax associated with each coding unit, wherein the syntax associated with each coding unit includes: a first flag indicating whether a child node was partitioned; if the flag indicates that the child node is partitioned, a second flag indicating whether to split the child node horizontally or vertically; a third flag indicating whether the partition is symmetric or asymmetric; if the second flag indicates a horizontal partition and the third flag indicates an asymmetric partition, a fourth flag indicating whether a left or right child child node is a larger child node in the horizontal, asymmetric split; and if the second flag indicates a vertical partition and the third flag indicates an a symmetric partition, a fifth flag indicating whether a top or bottom child coding unit is a larger coding unit in the vertical, asymmetric split. The method also includes decoding the identified coding units using JVET.

The present disclosure also provides an apparatus for coding video data comprising one or more processors configured to perform the techniques disclosed herein.

BRIEF DESCRIPTION OF THE DRAWINGS

Further details of the present invention are explained with the help of the attached drawings in which:

FIG. 5A depicts an exemplary partitioning of a CTU using quadtree partitioning in to four equal square nodes.

FIG. 5B illustrates binary partitioning to divide a parent node into two child nodes of the same size in a symmetric manner.

FIGS. 5C and 5D depict asymmetric partitioning of a parent node in to two child nodes of unequal sizes in an asymmetric manner.

FIG. 5E illustrates embodiments for additional constraints placed on the QTBT partitioning, where each of Types 1-4 provide variations in the vertical and/or horizontal partition.

DETAILED DESCRIPTION

Disclosed herein are techniques for a flexible coding block structure for increasing increase the number of supported block sizes for spatial intra prediction, temporal inter prediction as well as transformation. In particular, disclosed are general methods of partitioning a block, either square or rectangular, which leads to more flexible block sizes with possible higher coding efficiency. In embodiments, mixed square and rectangular block partitioning methods are disclosed for JVET, which show better coding performance as compared to square-block only data structures described in HEVC.

Figure 1A:
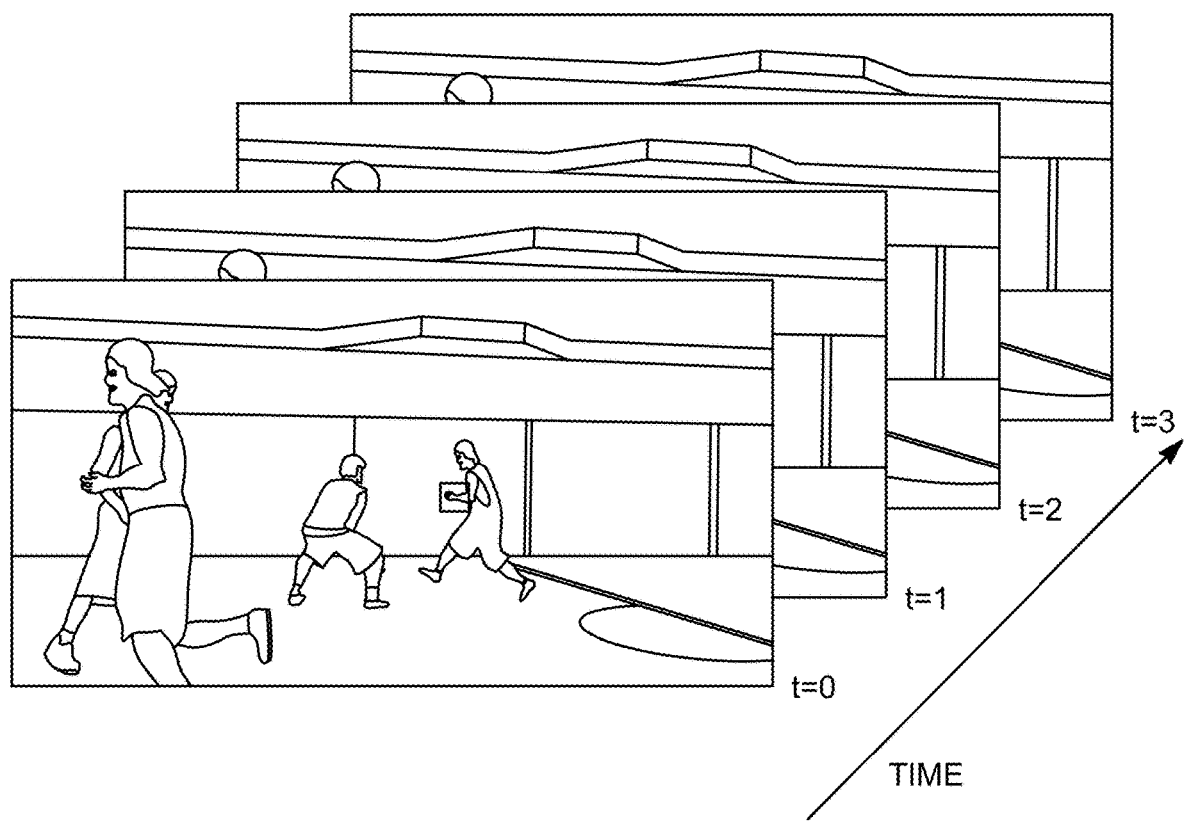
FIG. 1A illustrates an example video including a set of pictures.

FIG. 1A illustrates an example video including a set of pictures, where each picture is a frame of the video sequence at a time, e.g., t=0, t=1, t=2, t=3.

Figure 1B:
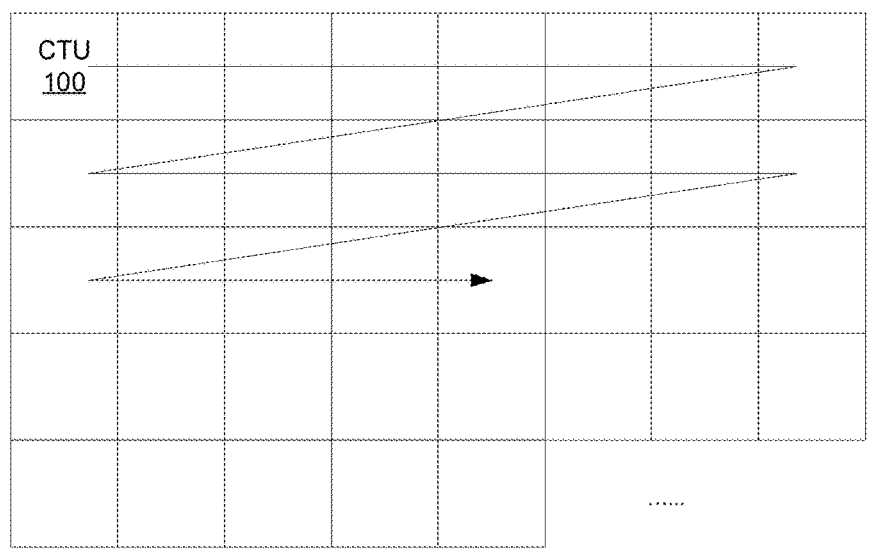
FIG. 1B depicts division of a frame such as that shown in FIG. 1A into a plurality of Coding Tree Units (CTUs) 100.

FIG. 1B depicts division of a frame such as that shown in FIG. 1A into a plurality of Coding Tree Units (CTUs 100. A frame can be an image in a video sequence, which may include a plurality of frames. A frame can include a matrix, or set of matrices, with pixel values representing intensity measures in the image. The pixel values can be defined to represent color and brightness in full color video coding, where pixels are divided into three channels. For example, in a YCbCr color space pixels can have a luma value, Y, that represents gray level intensity in the image, and two chrominance values, Cb and Cr, that represent the extent to which color differs from gray to blue and red. In other embodiments, pixel values can be represented with values in different color spaces or models. The resolution of the video can determine the number of pixels in a frame. A higher resolution can mean more pixels and a better definition of the image, but can also lead to higher bandwidth, storage, and transmission requirements.

Frames of a video sequence, or more specifically the coding tree units within each frame, can be encoded and decoded using JVET. JVET is a video coding scheme being developed by the Joint Video Exploration Team. Versions of JVET have been implemented in JEM (Joint Exploration Model) encoders and decoders. Similar to other video coding schemes like HEVC (High Efficiency Video Coding), JVET is a block-based hybrid spatial and temporal predictive coding scheme. During coding with JVET, a frame is first divided into square blocks called CTUs 100, as shown in FIG. 1. For example, CTUs 100 can be squares or blocks of 128×128 pixels.

Figure 1C:
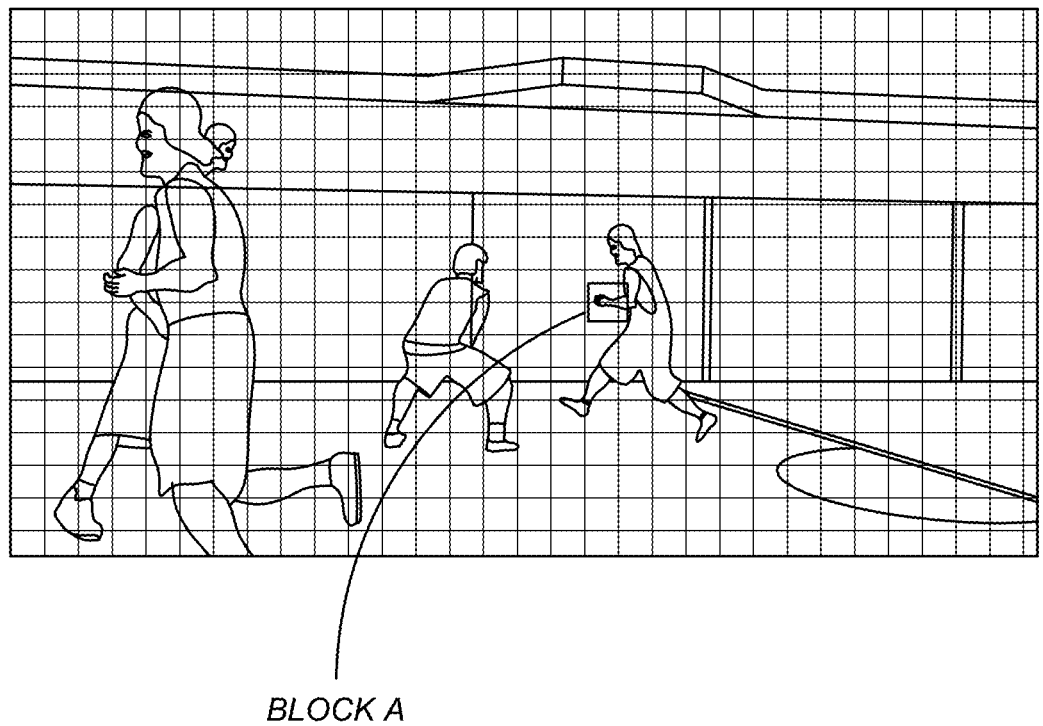
FIG. 1C illustrates the picture in FIG. 1A divided into fixed sized blocks.
Figure 1D:
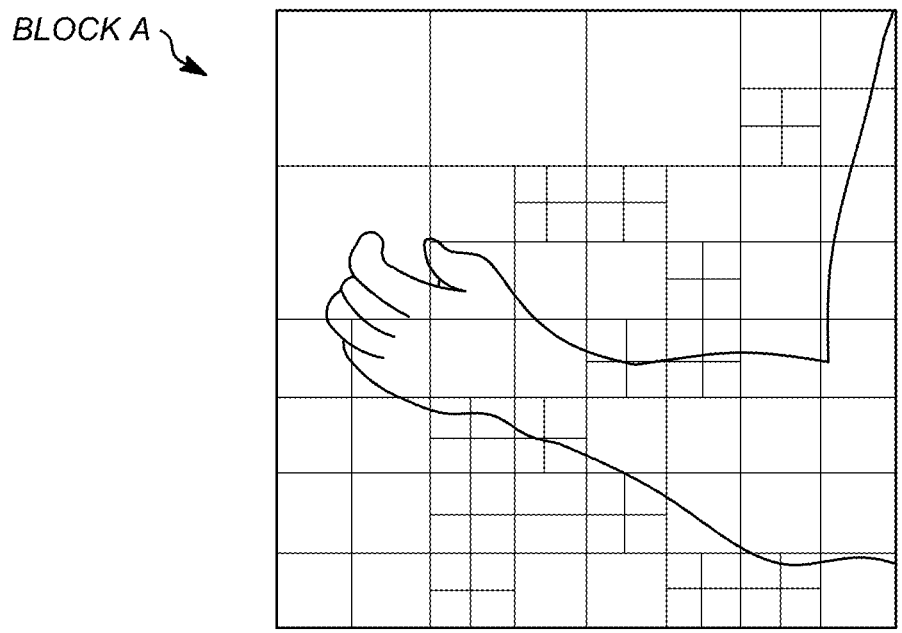
FIG. 1D illustrates a single CTU partitioned into multiple CUs.

FIG. 1C illustrates the picture in FIG. 1A divided into fixed sized blocks, or CTUs. FIG. 1D illustrates a single CTU partitioned into multiple CUs. As illustrated, a CTU may be partitioned into smaller coding units, or blocks, as shown in FIG. 1C. A block may generally be used to refer to the 2D block that defines a CTU or the smaller blocks that result from partitioning the CTU, or coding units, where the coding units have a particular width and height.

Figure 2A:
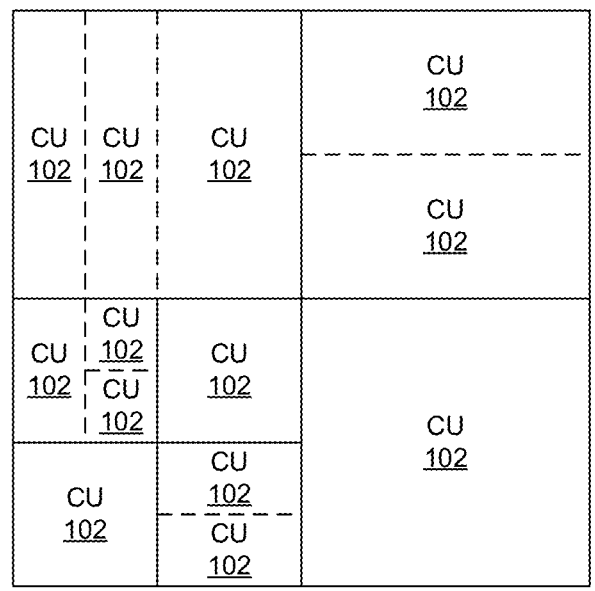
FIG. 2A depicts an exemplary partitioning of a CTU into Coding Units (CUs) using quadtree partitioning and symmetric binary partitioning.

FIG. 2A depicts an exemplary partitioning of a CTU 100 into CUs 102, which are the basic units of prediction in coding. The coding unit may be represented by a region (in terms of pixels/luma-samples) and is a final node of the partitioned CTU.

Generally, the decision whether to code a picture area using inter-picture (temporal) or intra-picture (spatial) prediction may be made at the coding unit level, so a slice is divided into a sequence of CTUs during the encoding process. Each CTU 100 in a frame can be partitioned into one or more CUs (Coding Units) 102. CUs 102 can be used for prediction and transform as described below. Unlike HEVC, in one or more embodiments in JVET the CUs 102 can be rectangular or square. Further, in one or more embodiments, JVET CUs can be coded without prediction units, or transform units, which removes the separation of CU, PU, and TU concepts and supports flexibility for additional CU partition shapes to better match the local characteristics of video data. In one or more embodiments, the encoder includes a process to try a plurality of coding modes that do not require further partitioning for prediction and transform, which can reducing coding costs, complexity, and time. In some cases, the partitioning of the CUs 102 may still be referred to as a partitioning in to prediction units or transform units. The CUs 102 can be as large as their root CTUs 100, or be smaller subdivisions of a root CTU 100 as small as 4×4 units.

In JVET, a CTU 100 can be partitioned into CUs 102 according to a quadtree plus binary tree (QTBT) scheme in which the CTU 100 can be split into square units according to a quadtree or binary partitioning, and those square units can then be split horizontally and/or vertically according to quadtree or binary trees. For example, child nodes of a binary split may be further split using binary partitioning. Thus, JVET's QTBT coding scheme may be more flexible than HEVC's quadtree structure (QT) because in addition to QT partitioning from a parent node in to equal sized children nodes, QTBT enables binary partitioning (BP) from a parent node into children nodes horizontally or vertically. The QTBT structure introduced, therefore, represents a tree in which a parent node can split using quadtree into four child nodes, or by using other partitioning methods as described in more detail below. Each of the child nodes may become a parent node for another split into additional child nodes. Though, in one or more embodiments, once a binary split occurs, further quadtree partitioning may not be allowed.

Figure 2B:
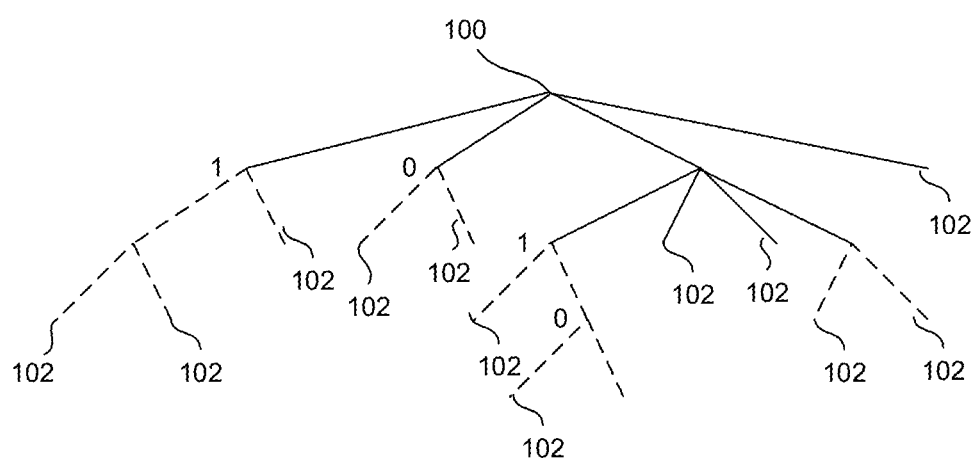
FIG. 2B depicts a quadtree plus binary tree (QTBT) representation of FIG. 2A's partitioning.

In some embodiments JVET can limit binary partitioning in the binary tree portion of a QTBT to symmetric partitioning, in which parent nodes can be divided in half either vertically or horizontally along a midline. By way of a non-limiting example, FIG. 2B shows a CTU 100 partitioned into CUs 102, with solid lines indicating quadtree splitting and dashed lines indicating symmetric binary tree splitting. As illustrated, the binary splitting allows symmetric horizontal splitting and vertical splitting to define the structure of the CTU and its subdivision into CUs.

It is noted that the term coding block is generally used to define a region covering a particular component (e.g. luma, and may differ in spatial location when considering chroma sub-sampling such as 4:2:0. A block is also used to describe the shape of CTUs and CUs, but the terms should be clear from the context. For example, as described in more detail below, a CU sometimes includes coding blocks (CBs of different colour components, e.g. one CU contains one luma CB and two chroma CBs in the case of P and B slices of the 4:2:0 chroma format and sometimes consists of a CB of a single component, e.g., one CU contains only one luma CB or just two chroma CBs in the case of I slices. In one or more embodiments, the CTU includes a luma coding tree block and corresponding chroma coding tree blocks and syntax elements, which can be partitioned in to smaller blocks using a tree structure and quadtree-plus signaling, where the tree structure syntax of the CTU specifies the size and positions of its luma and crhoma coding blocks.

FIG. 2B shows a QTBT representation of FIG. 2A's partitioning using a tree structure. The tree may be used to represent a finite set of nodes with a unique root node. In a tree structure, samples may be processed in units of coding tree blocks. Each coding tree block may be assigned a partition, the partition signaling to identify the block sizes for intra or inter prediction and for transform coding. The partitioning may be a recursive quadtree partitioning or, as shown herein, a quadtree plus partitioning method that contemplates much more flexibility to the coding tree structure. The division of a component into coding tree blocks is a partitioning.

A CTU, such as CTU 100, is a type of coding tree block that represents an entire N×N square of picture samples for some value of N, where the first root node at the highest hierarchy of the tree structure (depth 0 is associated with the entire coding tree block or CTU. A root node with depth 0 may be partitioned in to two or more child nodes, also referred to herein as leaf nodes. For example, a quadtree node could be further partitioned by a binary tree, where the quadtree leaf node is also the root node for the binary tree having binary tree depth as 0. Further, while each of the nodes split from a prior node may be child nodes or leaf nodes, such nodes are also parent nodes when the child node is further partitioned into additional child nodes. Thus, a node may exist as both a parent node and a child node, and a root node may also be referred to herein as a parent node.

The tree structure is split among multiple branches and a single branch may include several nodes, until a final leaf along each branch is reached, which is referred to as the coding unit. Thus, a final leaf node in a recursively split branch is also referred to herein as a terminating leaf node or final child node. Collectively these final leaf nodes represent the final set of coding units (CUs) that make up the CTU, and will not be further partitioned. Thus, where a leaf node represents a coding unit the terms may be used interchangeably, and a final leaf node should be understood to correspond to the final coding unit along the respective branch.

The root node in FIG. 3 is shown split using quadtree partitioning resulting in four equal children. Each of the four nodes branching from the root node are therefore child nodes, As shown in FIG. 3, the squares represented by the quadtree leaf nodes can then be divided symmetrically zero or more times using binary trees, with the quadtree leaf nodes being child nodes but also parent nodes of the binary trees, where a root node may refer to parent nodes at various depths of the tree structure. The parent node of a binary split represents a parent block that may be further partitioned into two child nodes or blocks. At each level of the binary tree portion, a square node can be divided symmetrically, either vertically or horizontally. A flag set to "0" indicates that the square node is symmetrically split horizontally, while a flag set to "1" indicates that the square node is symmetrically split vertically.

Figure 3A:
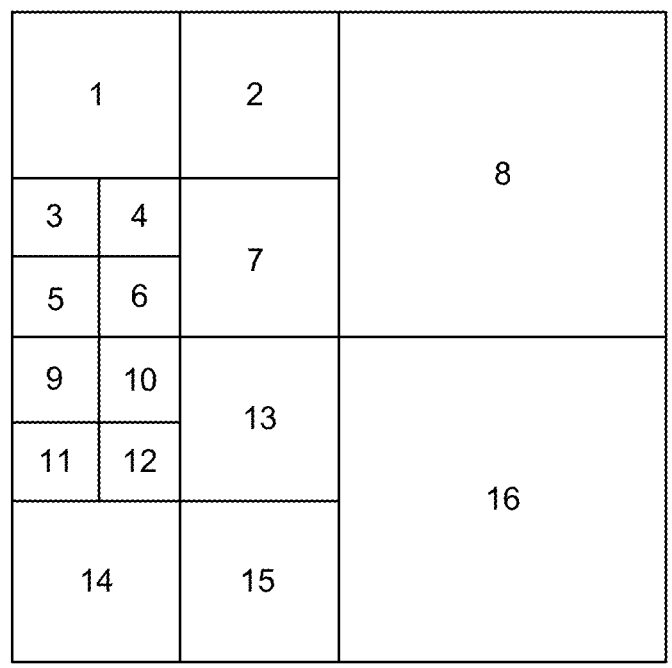
FIG. 3A depicts another exemplary partitioning of a CTU into Coding Units (CUs) using quadtree partitioning and symmetric binary and quadtree partitioning.
Figure 3B:
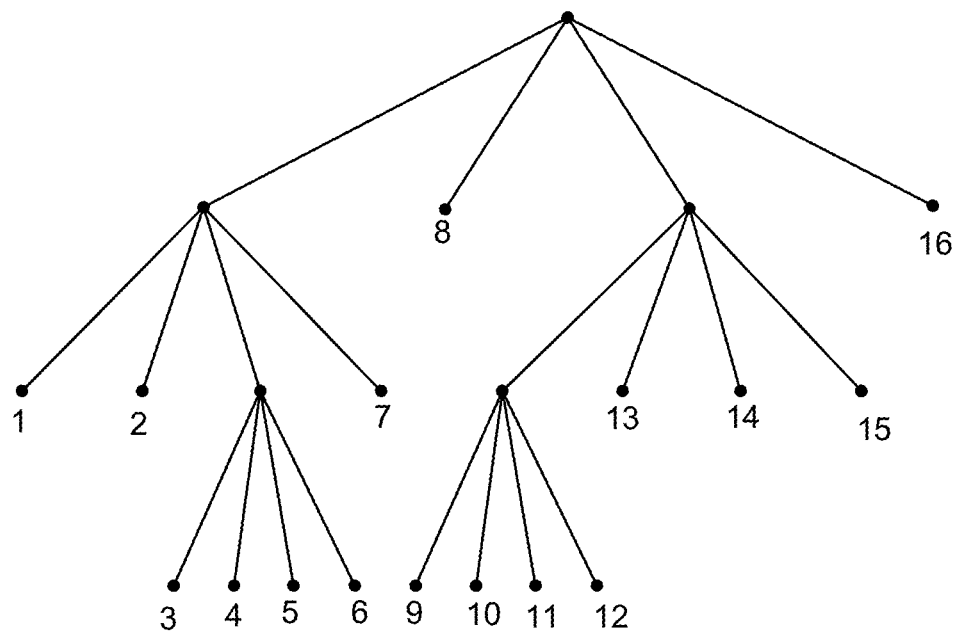
FIG. 3B depicts a quadtree plus binary tree (QTBT) representation of FIG. 3A's partitioning.

FIG. 3A depicts another exemplary partitioning of a CTU 100 into CUs 102, wherein each child unit is identified by numbers 1-16, and FIG. 3B shows a tree structure representation of FIG. 2A's partitioning. As illustrated by this embodiment, the CTU block partition is represented by a tree structure, where at each node of the tree data structure there is another block, either a square or rectangular coding unit. The child nodes, either square or rectangular, at a node of a tree data structure may be quadtree partitioned (quad split or binary partitioned (binary split into multiple equal sized child coding units. For example, a 4N×4N square coding unit can be split in to four square blocks of N×N or two rectangular blocks of 1N×4N and 3N×4N, where N is an integer.

FIGS. 3A and 3B illustrate partitioning limited to quadtree, although binary partitioning may also result in square and rectangular units. As shown in FIG. 3A, the root node repeated by the entire block in FIG. 3A is quadtree partitioned into four child units. Child unit 8 and 16 are final coding units, as they are not further partitioned. A $3^{rd}$ child unit is quadtree portioned, resulting in final coding units 1, 2, 7, and another child unit quadtree partitioned again into final coding units 3, 4, 5, and 6. Similarly, a 4th child unit from the original root node quadtree partitioning is partitioned into child units 13, 14, 15, and another child unit quadtree partitioned again in to final coding units 9, 10, 11, and 12. As illustrated in FIG. 3A, the recursively quadtree partitioned nodes result in child nodes that are successively partitioned until small square coding units are present. The child unit partitioned into child units 3, 4, 5, and 6 is the same size as its fellow quadtree partitioned units 1, 2, and 7. Thus, FIGS. 3A and 3B provide an example of recursive quadtree partitioning of a parent coding tree unit.

In one or more embodiments, JVET can allow either symmetric binary partitioning or asymmetric binary partitioning in a binary tree portion of a QTBT. In one or more embodiments, symmetric or asymmetric partitioning may occur at any depth in the tree structure. Asymmetrical motion partitioning (AMP) was allowed in a different context in HEVC when partitioning prediction units (PUs). However, for partitioning CUs 102 in JVET according to a QTBT structure, asymmetric binary partitioning can lead to improved partitioning relative to symmetric binary partitioning when correlated areas of a CU 102 are not positioned on either side of a midline running through the center of the CU 102. By way of a non-limiting example, when a CU 102 depicts one object proximate to the CU's center and another object at the side of the CU 102, the CU 102 can be asymmetrically partitioned to put each object in separate smaller CUs 102 of different sizes.

Table 1 provides examples for horizontal and vertical split ratios for a CUT with its width or height having a factor of 4, 3, 2, or 1. Let c be a factor of the width or height of a block and a:b indicates the split ratio.

TABLE 1

| Rules for splitting | | | | |
|---|---|---|---|---|
| c | | a:b | | |
| 4 | no split | 3:1 | 2:2 | 1:3 |
| 3 | no split | 2:1 | 1:2 | |
| 2 | no split | 1:1 | | |
| 1 | no split | | | |

As shown in Table 1, if a split has a=b, the split is symmetric or even. If the split has a≠b, the partition is referred to as asymmetric or uneven. For example, if 4 is a factor of the width of a block, the possible horizontal split for the block can be 3:1, 2:2 and 1:3. And the horizontal split rate of 3:1 means that the block is split into two blocks horizontally, and the width (or horizontal) ratio of the left block and the right block is 3:1

Figure 4A:
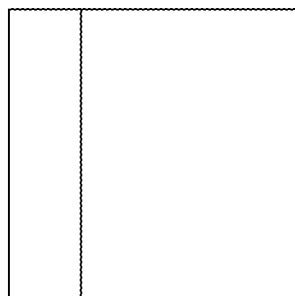
FIG. 4A depicts four possible types of asymmetric binary partitioning of a CU into two smaller CUs.
Figure 4A:
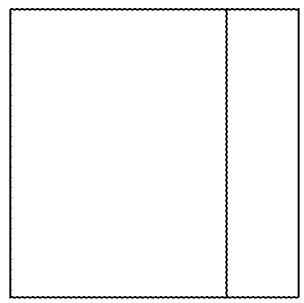
Figure 4A:
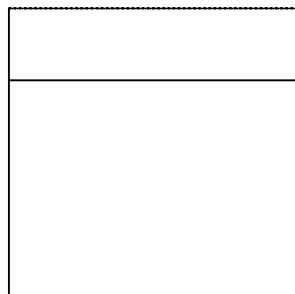
Figure 4A:
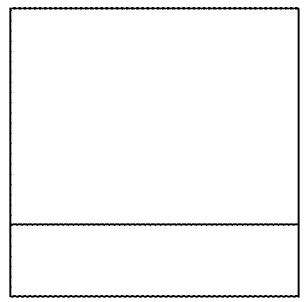

FIG. 4A depicts four possible types of asymmetric binary partitioning in which a CU 102 is split into two smaller CU 102 along a line running across the length or height of the CU 102, such that one of the smaller CUs 102 is 25% of the size of the parent CU 102 and the other is 75% of the size of the parent CU 102. The four types of asymmetric binary partitioning shown in FIG. 4A allow a CU 102 to be split along a line (a) 25% of the way from the left side of the CU 102, (b) 25% of the way from the right side of the CU 102, (c) 25% of the way from the top of the CU 102, or (d) 25% of the way from the bottom of the CU 102. In alternate embodiments an asymmetric partitioning line at which a CU 102 is split can be positioned at any other position such the CU 102 is not divided symmetrically in half. For example, the split may be at 30% and 70%, or 20% and 80%. However, limitations on partitioning based on the parent coding unit size and/or prior partitioning are described in more detail below.

Figure 4B:
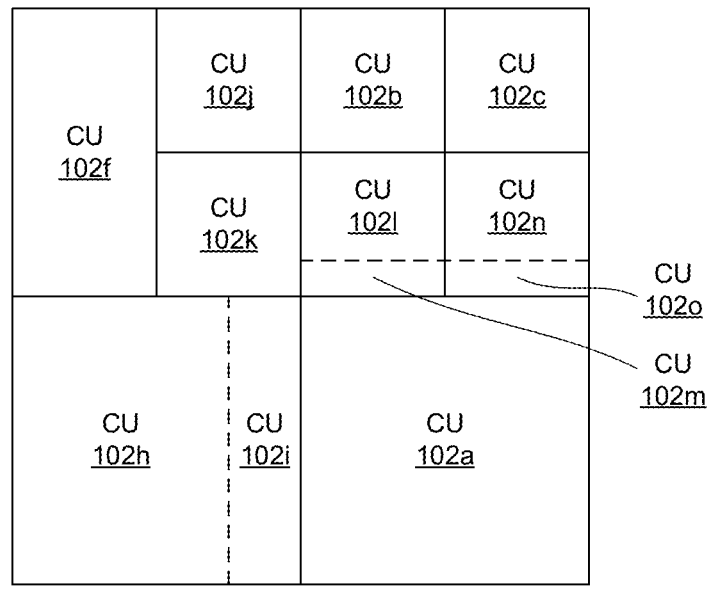
FIG. 4B depicts an exemplary partitioning of a CTU into Coding Units (CUs) including use of the partitioning depicted in FIG. 4A.

FIG. 4B depicts a non-limiting example of a CTU 100 partitioned into CUs 102 using a scheme that allows both symmetric binary partitioning and asymmetric binary partitioning in the binary tree portion of a QTBT. In FIG. 4B, dashed lines show asymmetric binary partitioning lines, in which a parent CU 102 was split using one of the partitioning types shown in FIG. 4A.

Figure 4C:
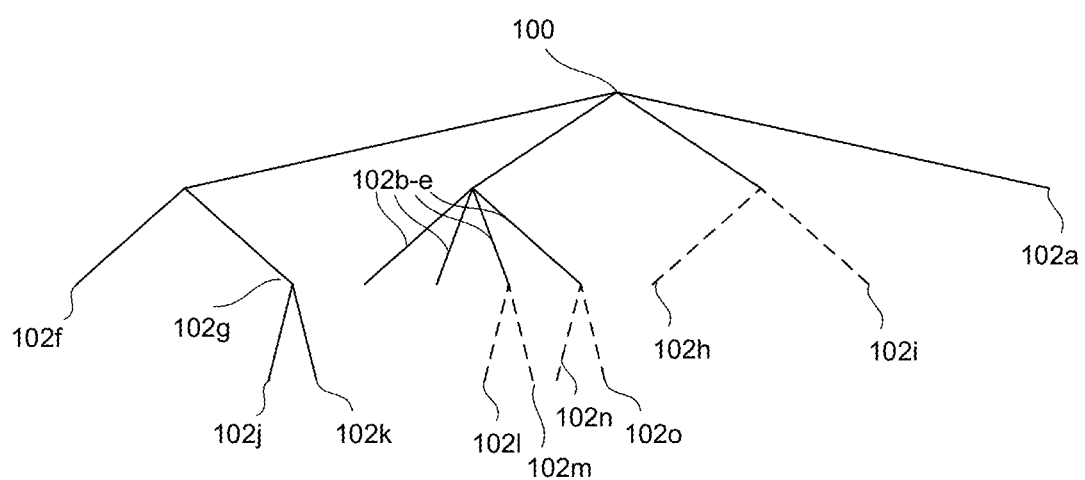
FIG. 4C depicts a quadtree plus binary tree (QTBT) representation of FIG. 4B's partitioning.

FIG. 4C shows a QTBT representation of FIG. 4B's partitioning. In FIG. 4C, two solid lines extending from a node indicates symmetric partitioning in the binary tree portion of a QTBT, while two dashed lines extending from a node indicates asymmetric partitioning in the binary tree portion.

Syntax can be coded in the bitstream that indicates how a CTU 100 was partitioned into CUs 102. A bitstream may comprise a sequence of bits, in the form of a network abstraction layer (NAL) unit stream or a byte stream that forms the representation of coded pictures and associated data forming one or more coded video sequences. A syntax may refer to an element of data represented in the bitstream, also referred to as a syntax element. Each syntax structure including zero or more syntax elements present together in the bitstream may be included in the NAL unit, and they may be presented in a specified order.

As described in more detail below, a syntax element may be a flag that is a variable or single-bit syntax element that can take one of two possible values: 0 and 1, or the syntax element may have multiple descriptors and or values available. A syntax may be a statement or element with an associated descriptor. The syntax element may be an expression used to specify conditions for the existence, type, and quantity for the syntax. When a syntax element appears, it may specify which syntax element to parse from the bitstream. A bitstream pointer may be advanced to the next position beyond the syntax element in the bitstream parsing process.

By way of a non-limiting example, syntax can be coded in the bitstream that indicates which nodes were split with quadtree partitioning, which were split with symmetric binary partitioning, and which were split with asymmetric binary partitioning. Similarly, syntax can be coded in the bitstream for nodes split with asymmetric binary partitioning that indicates which type of asymmetric binary partitioning was used, such as one of the four types shown in FIG. 4A. Thus, the partitioning and organization of a tree structure may be expressed by a series of flags or syntax elements. Further, a syntax element may be signaled to indicate which splitting type (i.e., horizontal or vertical) is used, where an example flag with a value 0 indicates horizontal splitting and 1 indicates vertical splitting. In some cases, such as quadtree partitioning, signaling may not be required since quadtree partitioning is an equal split horizontally and vertically into 4 equal sub-blocks.

The example child nodes and partitioning thereof included herein demonstrate that a child node may be split, or partitioned, into smaller, final coding units. A root node may represent the entire CTU, and is also referred to as a parent coding unit when partitioned into child nodes. Thus, a node may represent both a parent block and a child block because the child nodes become parent nodes if/when they are partitioned.

While additional embodiments are depicted in this disclosure such as described below with respect to FIG. 5A-H and 6A-6B, FIGS. 3C and 4C represent a QTBT structure with a combination of restrictions in place. Parameters can be set to control splitting according to the QTBT, such as the CTU size, the minimum sizes for the quadtree and/or binary tree leaf nodes, the maximum size for the binary tree root node, and the maximum depth for the binary trees. For example, nodes may be recursively split into smaller nodes until a minimum coding unit size or a maximum number of partitions has occurred. Restrictions may also be in place that limit the type of partitioning allowed depending on other factors, such as a type of prior partitioning of said parent node. For example, if the child node is the result of a binary partition, restrictions regarding the type of further partitioning allowed, if any, may be implicated. In another example, if the child node is the result of asymmetric partitioning, restrictions regarding the type of further partitioning allowed, if any, may be implicated. It should be understood that one or more of the restrictions depicted may be removed or be defined by a subset combination of those shown.

As depicted in FIG. 3C, the partitioning is restricted to quadtree partitioning into equal sized squares. As depicted in FIG. 4C, in one or more embodiments the use of asymmetric partitioning can be limited to splitting CUs 102 at the leaf nodes of the quadtree portion(s) of a QTBT, where asymmetric partitioning is not allowed except at the leaf node of a quadtree. In one or more embodiments, CUs 102 at child nodes that were split from a parent node using quadtree partitioning in the quadtree portion can be final CUs 102, such as CTU 102*a*. In one or more embodiments, CUs 102 at child nodes split from the parent node using quadtree partitioning can be further split using at least one of quadtree partitioning 102*b-e*, symmetric binary partitioning 102*f*, 102*g*, and/or asymmetric binary partitioning 102*h*, 102*i*. In one or more embodiments, child nodes in the binary tree portion(s) that were split using symmetric binary partitioning can be final CUs 102, such as 102*f*. In one or more embodiments, child nodes in the binary tree portion split using symmetric binary partitioning can be further split recursively one or more times using symmetric binary partitioning only, such as 102*j*, 102*k*. In one or more embodiments, child nodes in the binary tree portion that were split from a QT leaf node using asymmetric binary partitioning can be final CUs 102, such as 102*h*, 102*i*, with no further splitting permitted.

In embodiments where the use of asymmetric partitioning is limited to splitting quadtree leaf nodes, search complexity may be reduced and/or overhead bits limited. In one or more JVET embodiments, a condition may be imposed that prohibits quadtree partitioning in a binary tree node such that a binary partitioned child node cannot be further partitioned using quadtree. In either scenario, asymmetric partitioning in a QTBT structure may be employed using the disclosed techniques to limit overhead signaling, such that excessive overhead signaling is not required. For example, in embodiments in which only quadtree leaf nodes are split with asymmetric partitioning, the use of asymmetric partitioning can directly indicate the end of a branch of the QT portion without other syntax or further signaling. This type of signaling may also be referred to as implicit signaling, i.e., to signal what option is selected by using available information at the decoder to make a decision without an explicit signal or flag. Such technique may be more efficient when another syntax element inherently includes information that the explicit flag would redundantly provide. Similarly, for embodiments in which asymmetrically partitioned nodes cannot be split further, the use of asymmetric partitioning on a node can also directly indicate that its asymmetrically partitioned child nodes are final CUs 102 without other syntax or further signaling.

One or more embodiments disclosed herein include schemes where asymmetrical partitioning is only allowed at the bottom level of a quadtree portion of a proposed QTBT structure, allowing no further splits for asymmetrical partitioned nodes. Such limitations, e.g., no further partitioning allowed to a child node if its parent was asymmetrical partitioned, may be imposed based on encoder/decoder complexity. Further, as described in more detail below, for the dimensions of a child block that is a product of asymmetric partitioning and is not a square, further asymmetric splits that create non-integer ratios with respect to the other child nodes and the root parent node may require additional coding complexity to design a transform process for the non-integer size. Odd size transform is not supported.

If a node uses quadtree partitioning, therefore, the node may have children and the children can use quadtree partitioning, binary partitioning, and/or asymmetric partitioning. But, in embodiments where asymmetrical partitioning is only allowed at the bottom level, if a node uses asymmetric partitioning then no further splits are allowed for that node. Further, in embodiments, if a node uses binary partitioning, the node may have children but its children nodes can only use binary partitioning. FIGS. 4B and 4C illustrate an example of a QTBT with asymmetric partitioning.

In alternate embodiments, such as when limiting search complexity and/or limiting the number of overhead bits is less of a concern, asymmetric partitioning can be used to split nodes generated with quadtree partitioning, symmetric binary partitioning, and/or asymmetric binary partitioning. In some instances, a flexible approach to partitioning may be too flexible and require highly complex encoder operations, or they may be too restrictive and result in suboptimal coding performance.

FIGS. 5A-5E provide examples of flexible partitioning in QTBT in a modular manner, and achieving flexibility while maintaining lower encoder complexity. As described, multiple partitioning methods may be supported, such as quadtree partitioning, binary partitioning, and asymmetric partitioning, and one or more split types may be supported, such as horizontal or vertical splits. In one or more embodiments, the partitioning methods may occur in any order without limits on the type of partitioning operations that occur recursively within a CTU (or, visualized using the coding tree, having no limits on the partitioning shown in series, or recursively, along a branch stemming from a QTBT root node. The syntax representing the tree structure and the processing order of the generated CUs may specify order where it matters or may signal an indicator when a specific processing order to generate the tree by the decoder is not needed.

As described above, the partitioning employed may be subject to certain restrictions. For example, a node may be recursively partitioned until its level or level depth reaches a permissible maximum level or level depth. The splitting process for the node may be recursively indicated, and syntax elements for the last coding unit that is not further partitioned, or a final leaf node, in the level may be defined. Recursive splitting refers to the successive partitioning that occurs within a single node. When a child node is split it becomes a parent node having child nodes, and each successive child node that results from successive partitioning is a result of recursive partitioning.

FIG. 5A illustrates quadtree partitioning to divide a parent node into four child nodes of the same size in square shape. The child nodes of such quadtree partitioning are square nodes (SN.

FIG. 5B illustrates binary partitioning to divide a parent node into two child nodes of the same size in a symmetric manner. Child nodes of binary partitioning are called binary nodes (BN.

FIG. 5C and FIG. 5D depict non-limiting examples of asymmetric partitioning that support modular partitioning. In such examples, the asymmetric partitioning divides a parent node into two child nodes of unequal sizes in an asymmetric manner (one is larger than another.

As disclosed herein, flexible coding structures that allow asymmetrical partitioning as part of the QTBT structure may be modified. Techniques disclosed and further described below include an example of partitioning using quadtree, then partitioning the child units resulting from the quadtree partition using asymmetric partitioning based on a 3:1 ratio. The larger child unit resulting from the asymmetric partitioning may be further partitioned using a 2:1 asymmetrical partitioning. Other embodiments are disclosed below.

FIGS. 5C and 5D depict asymmetric partitioning of a parent node in to two child nodes of unequal sizes in an asymmetric manner. In FIG. 5C, the parent node may be a square node that results from quadtree partitioning of a root node, for example, where further partitioning results in child node B being three times as large as the child node A for a ratio of 3:1. Each of Types 1, 2, 3 and 4 depicted in FIG. 5C are partitioned differently in horizontal or vertical directions but with the same 3:1 ratio. In embodiments, the larger child node from the asymmetric partitioning is a restricted node and the smaller child node is a binary node, such that in FIG. 5C child node A denotes a binary node (BN and child node B denotes a restricted node (RN, where the size of child node B is larger than child node A.

FIG. 5D depicts asymmetric partitioning in which a parent restricted node, such as child node B from FIG. 5C, is asymmetrically partitioned into two child nodes of unequal size in an asymmetric manner, where one is twice as large as the other for a size ratio of two (2:1). The restriction on the restricted node may be on the ratio of asymmetrical partitioning allowed, which is described in more detail below. Child nodes resulting from this type of asymmetric partitioning may be considered binary nodes. Thus, child node A denotes a smaller binary node and child node B denotes the larger binary node, where the parent node is the restricted node. And as with FIG. 5C, each of Types 1, 2, 3 and 4 depicted in FIG. 5C are partitioned differently in horizontal or vertical directions.

As illustrated by the example embodiments, partitioning may result in a restricted node that is restricted in certain ways. For example, an example of partitioning for a proposed QTBT may require that if a node uses quadtree partitioning, the child nodes may be square nodes that can be partitioned using quadtree partitioning, binary partitioning, or the 3:1 asymmetric partitioning shown in FIG. 5C. The 3:1 partitioning shown in FIG. 5C of at least one of the square nodes partitioned from the parent node may be partitioned in to binary node A, the smaller child node, and a restricted node B, the larger child node. In an example where a restricted node results from 3:1 asymmetric partitioning, the child binary node A can further use binary partitioning or the 3:1 asymmetric partitioning shown in FIG. 5C, while the child restricted node B can only use the 2:1 asymmetric partitioning shown in FIG. 5D. In another example of a restriction in one or more embodiments for the disclosed QTBT structure, if a node uses binary partitioning or the 2:1 asymmetric partitioning shown in FIG. 5D, the child nodes are binary nodes and each binary node can use binary partitioning and/or the 3:1 asymmetric partitioning in FIG. 5C (but not further partitioned according to a 2:1 ratio).

Thus, if restrictions described above are applied in combination, a set of rules may apply for a QTBT structure as follows:

1. If a node uses quadtree partitioning (QP), its child nodes are square nodes (SN) and they can use QP, binary partitioning (BP) or 3:1 asymmetric partitioning (AP).
2. If a node uses 3:1 asymmetric partitioning, its child nodes are one binary node (BN) and one restricted node (RN). Its child BN can use BP or 3:1 asymmetric while its child RN can only use 2:1 asymmetric partitioning.
3. If a node uses BP or 2:1 asymmetric partitioning, its child nodes are BN and they can use BP or 3:1 asymmetric.

The 3:1 and 2:1 partitions illustrated by FIGS. 5C and 5D are example ratios for the disclosed asymmetric partitioning methods, but it should be understood that there may be more than two symmetric partitions and different size ratios between the child nodes are contemplated. For example, the larger child node resulting from the partitioning may be four times as large as the smaller child node (4:1), or any other asymmetric division that results in child nodes of different sizes (e.g., 7:4, 5:2, 2.5:1). In other words, there may be more than two AP methods and/or size ratios between the child nodes from each of AP, where the size ratios for asymmetric partitioning can be anything other than 1.

FIG. 5E illustrates embodiments for additional constraints placed on the QTBT partitioning, where each of Types 1-4 provide variations in the vertical and/or horizontal partition. Additional constraints may be desirable to reduce overhead. For example, binary nodes that are child nodes of a parent restricted node may be split so the larger binary node lies next to the complimentary binary nodes of its parent restricted node, and is partitioned so the smaller binary node has the same dimension as the complimentary binary node of its parent restricted node. The shaded shapes in FIG. 5E denote the parent restricted node and the unshaded shapes denote the complimentary BN.

To add a complexity control that supports modular implementation, a parameter called size discrepancy limit (SDL may be employed to limit smallest size of BN and RN. This parameter sets a minimum size of child node based on ratio of its horizontal and vertical dimensions, referred to as size discrepancy (SD, as described in equation 1 below. For example, in example embodiments when SDL is set to 4, a BN of size 32×4 or a RN of size 12×64 is not allowed. When a SDL parameter is enforced, a max BT depth parameter can be dropped in one or more embodiments.

$$SD=\max(width,height)/\min(width,height) \quad (1$$

Figure 5F:
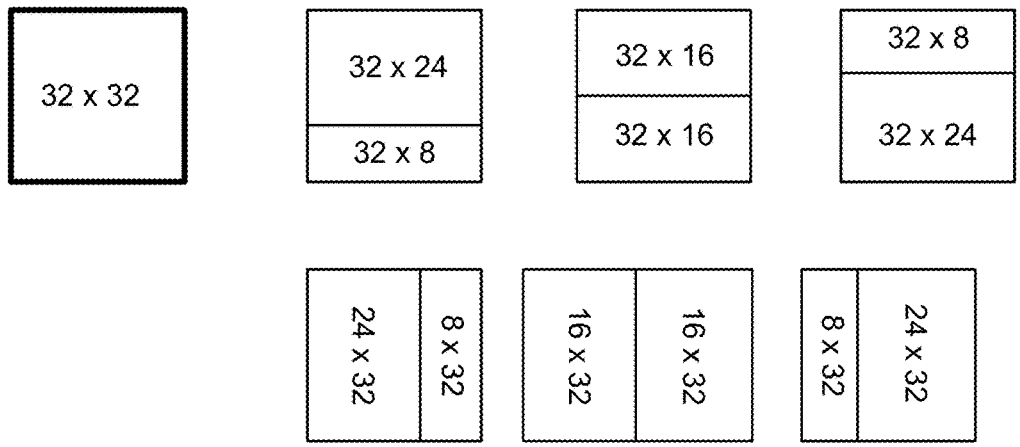
FIG. 5F illustrates an example of possible partitions for a 32×32 CTU.

FIG. 5F illustrates an example of possible partitions for a 32×32 CTU. A 32×32 block could be partition into at least one of: 1 a square block of 32×32, 2 two rectangular blocks of 32×24 and 32×8 with a vertical split ratio equal to 3:1, 3 two rectangular blocks of 32×16 and 32×16 with a vertical split ratio equal to 2:2, 4 two rectangular blocks of 32×8 and 32×24 with a vertical split ratio equal to 1:3, 5 two rectangular blocks of 24×32 and 8×32 with a horizontal split ratio equal to 3:1, 6 two rectangular blocks of 16×32 and 16×32 with a horizontal split ratio equal to 2:2, or 7 two rectangular blocks of 8×32 and 24×32 with a horizontal split ratio equal to 1:3.

Figure 5G:
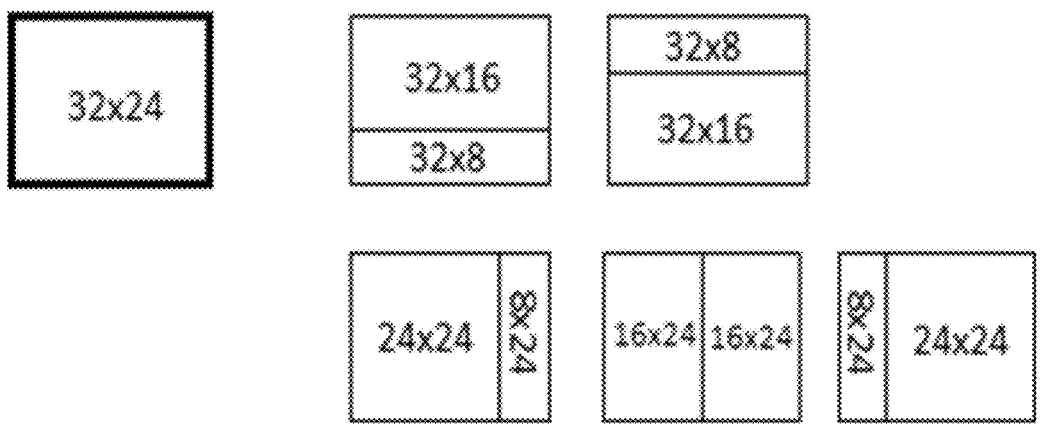
FIG. 5G illustrates an example of possible partitions for a 32×24 CTU

FIG. 5G shows the example of possible partitions for a 32×24 block. A 32×24 block could be partition into at least one of: 1 a square block of 32×24, 2 two rectangular blocks of 32×8 and 32×16 with a vertical split ratio equal to 1:2, 3 two rectangular blocks of 32×16 and 32×8 with a vertical split ratio equal to 2:1, 4 two rectangular blocks of 24×24 and 8×24 with a horizontal split ratio equal to 3:1, 5 two rectangular blocks of 16×24 and 16×24 with a horizontal split ratio equal to 2:2, or 6 two rectangular blocks of 8×24 and 24×24 with a horizontal split ratio equal to 1:3.

Figure 5H:
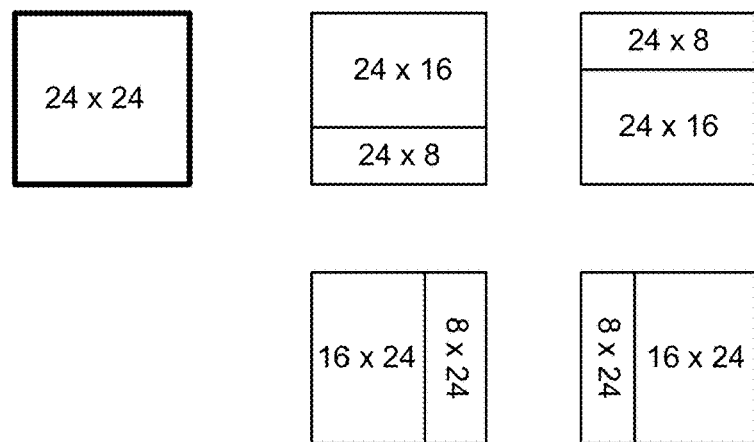
FIG. 5H shows the example of possible partitions for a 24×24 CTU

FIG. 5H shows the example of possible partitions for a 24×24 block. A 24×24 block could be partition into at least one of: 1) a square block of 24×24, 2) two rectangular blocks of 24×16 and 24×8 with a vertical split ratio equal to 2:1, 3) two rectangular blocks of 24×8 and 24×16 with a vertical split ratio equal to 1:2, 4) two rectangular blocks of 16×24 and 8×24 with a horizontal split ratio equal to 2:1, or 5) two rectangular blocks of 8×24 and 16×24 with a horizontal split ratio equal to 1:2.

Figure 6A:
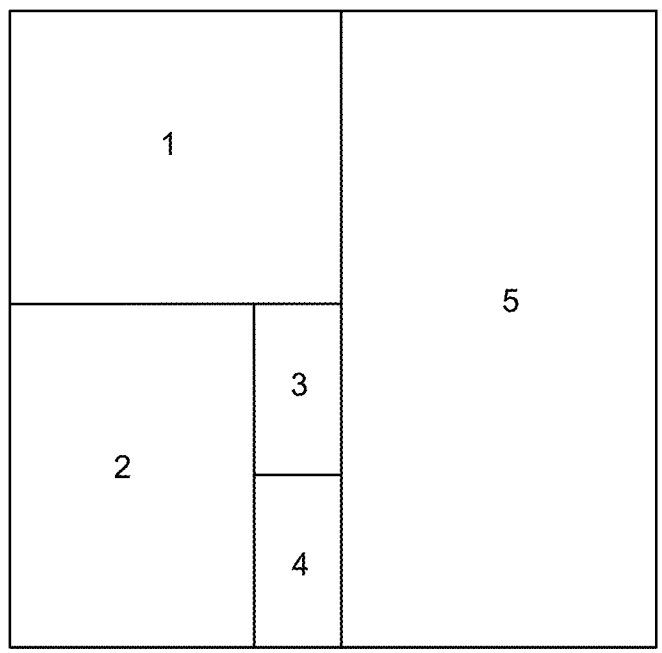
FIG. 6A illustrates an example for a block of 32×32, shown with the possible splits shown in FIG. 5F.
Figure 6B:
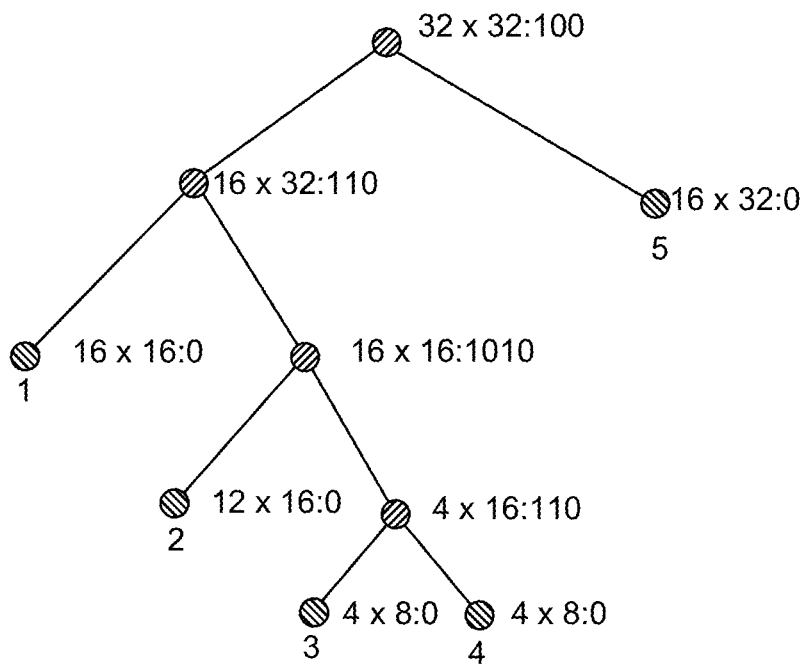
FIG. 6B depicts a QTBT representation of FIG. 6A's partitioning.

FIG. 6A illustrates an example for a block of 32×32, shown with the possible splits shown in FIG. 5F. FIG. 6B depicts a QTBT representation of FIG. 6A's partitioning.

As described herein, a syntax can be coded in the bitstream that indicates how a CTU was partitioned into CUs. FIG. 6B includes a syntax in the way of flags, or bin assignments, for each node (block), where each node's bin includes an assignment for each of the relevant flags. Thus to signal a partitioning of a CTU and the partitioning of the child nodes within the CTU, a proposed signal may be encoded with a series of flags, or bins.

In embodiments, a flag may indicate whether to to split or not split a block. For example, a value "1" may indicate a split and "0" may indicate not split. In embodiments, a flag may indicate whether to split a block horizontally or vertically. For example, a value "0" may indicate a horizontal split and a value "1" may indicate a vertical split. In embodiments, a flag may indicate whether to split a block symmetrically (even split) or asymmetrically (uneven split). For example, a value "0" may indicate a symmetric split and a value "1" may indicate a asymmetric split. In embodiments for an asymmetric split, a flag may indicate whether to split a block with the left or the right being the larger portion resulting from the horizontal split, and with the top or the bottom being the larger portion resulting from a vertical split. For example, the value "1" may indicate whether a block split with the left (or the top) being the larger portions for a horizontal (or vertical) split and a value "0" for a block split with the right (or the bottom) being the larger portions for a horizontal (or vertical) split.

As shown in FIG. 6B, an example of a series of flags, or bin assignments, is assigned to each node, where some nodes have a partitioned child node extending from the node in the tree structure. In this example, using the example set of flags described above, four bins for each node of the tree structure are assigned to provide details for the block partitions depicted in FIG. 6A. By way of example, the flags per node of FIG. 6A's tree structure is shown, which can be included in the syntax encoded, signaled, and decoded.

As shown by this example, the 32×32 CTU is first evenly split horizontally, where the root node has a bin assignment of 100: 1 for the split, 0 for the horizontal split, and 0 for the event split. Thus, three bins are assigned to the first node of the tree. Node 5, associated with coding unit 5 in FIG. 6A is not split further. Thus, only bin 0 is needed. The other node partitioned from the root node is the 16×32 block, split vertically. Thus, the bin assignment is 110, bin 1 for the split, bin 1 for a vertical split, and bin 0 for an even split.

Split from the 16×32 binary node are two child coding units sized at 16×16. The first 16×16 block is not split further. Thus, only bin 0 ("no split") is needed for the corresponding node. The other 16×16 binary node is further unevenly split horizontally. Thus, a bin assignment of 1010 is used, bin 1 for the split, bin 0 for the horizontal split, bin 1 for uneven split, and bin 0 to identify the left block being the larger child unit.

Another binary partition occurs to the 16×16 coding unit with bin assignment 1010. From this node, the left block sized 12×16 is not split further and thus the corresponding node is assigned 0. The right block sized 4×16 is further evenly split vertically. Thus, the assignment 110, 1 for the split, 1 for vertical split, and 0 for the even split. And finally, both the top and bottom blocks of the 4×8 coding units are not split, so they both receive a bin assignment of 0.

FIG. 6B provides an example of a syntax that represents that tree structure, such that the syntax is encoded in to a bitstream and a decoder can parse the syntax structure to recreate the coding units based on the signaled partitions.

Figure 6C:
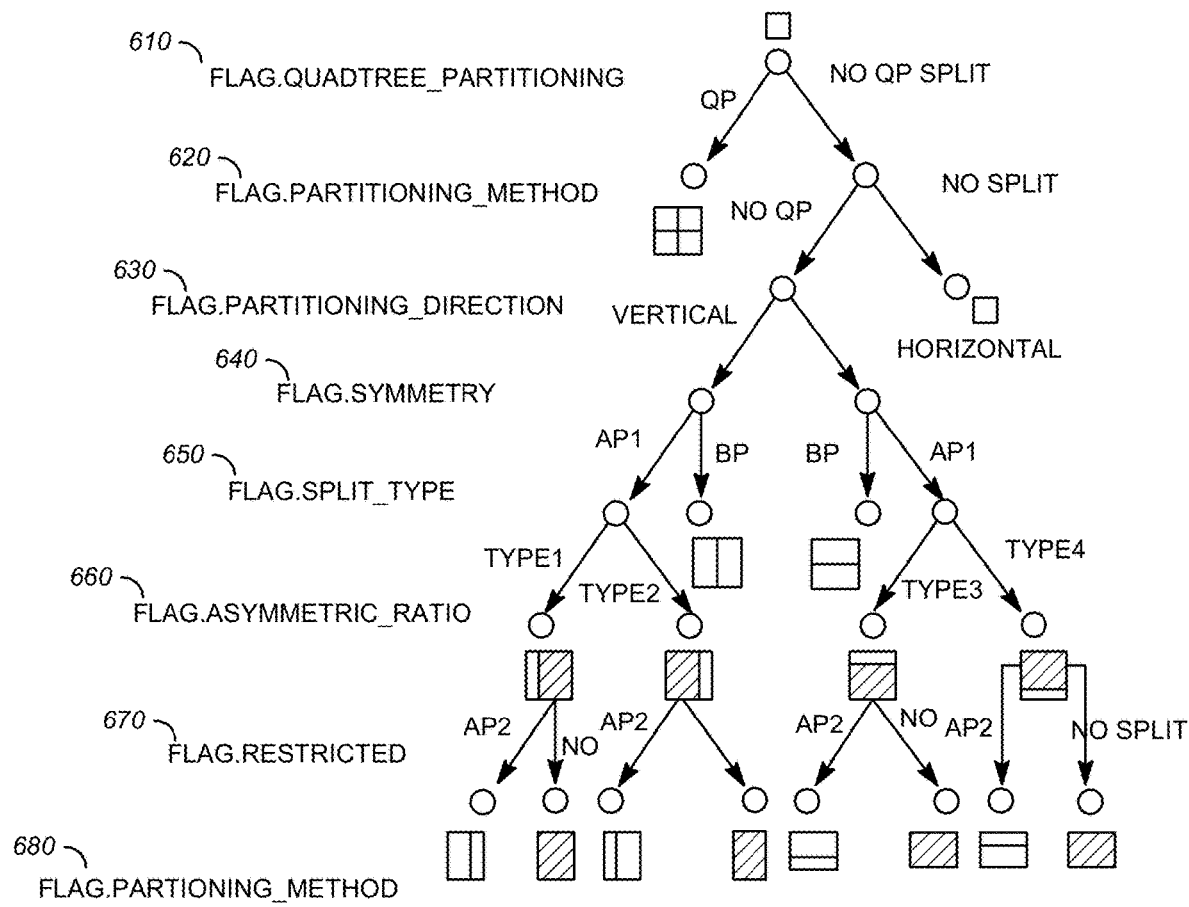
FIG. 6C illustrates an example syntax for partitioning that includes both square nodes (SN) and restricted nodes (RN).

FIG. 6C illustrates an example syntax for partitioning that includes both square nodes (SN) and restricted nodes (RN), where the restricted nodes in this example are represented by shaded shapes. Syntax elements may be included in a bitstream, and may be in an ordered sequence. The syntax elements may be found in a header of the bitstream, for example. As described in more detail below, decoding processes may occur based on syntax elements in a bitstream or picture slide header. A syntax element may also be referred to as a codeword or flag in a syntax structure. The syntax for each syntax element is encoded and signaled in the bitstream. The syntax elements describe how the video signal can be reconstructed at the decoder. For example, for a CTU, the related syntax elements describe the partitioning of the CTU into coding units and the representation of the CTU's partitioning in the tree structure. The decoder can parse the syntax structure to identify each of the syntax elements or flags within the structure to determine how the CTU and each CU was partitioned. While a codeword or a flag may be a syntax element having a single bit, multiple pieces of information may be defined using multiple values for a flag and, if necessary, additional bits may be used to signal additional options.

FIG. 6C provides a visual representation of a syntax structure having multiple layers of syntax elements encoded for signaling information on how the root node was partitioned and encoded. Example flags are used for each syntax element, and it should be understood that the naming convention of such syntax elements and/or flags may vary. As illustrated by this example, a first syntax to be encoded for a root node is a flag, e.g., flag.quadtree_partitioning, which indicates whether quadtree partitioning ("QP") is used or not ("No QP split"). As shown in the "QP" direction in FIG. 6C, the quadtree partitioning may result in four square child nodes of equal size. Such quadtree partitioned unit may be further partitioned, though in this example no further partitioning is depicted by way of example.

If "No QP split" is signaled by the flag.quadtree_partitioning syntax element, quadtree partitioning is not used. The flag.partitioning_method flag may be a second flag that, once determined by a first flag that QP is not used, the second flag indicating which non-QP method will be used or not. Alternately, the flag.partitioning_method flag may be used to indicate both whether the quadtree partitioning is used or not (e.g., value 0 for quadtree and any other value for "non-QP") and also signal the type of non-quadtree partitioning method used (e.g., value 1-3, 1=binary, 2=AP1, 3=AP2) is used.

As shown in FIG. 6C, the "Non QP" signaled in the syntax element may indicate that a non-QP partitioning technique is applied, and the "No split" example indicates that the node is not split by any partitioning method.

If there is further partitioning using a non-QP partitioning method, a third syntax may be signaled to indicate whether to partition in a horizontal or vertical direction. Both examples of a vertical partitioning direction and a horizontal partitioning direction are provided in FIG. 6C and the example syntax structure is named by way of example as flag.partitioning_direction.

For either of the identified vertical or horizontal partitioning directions, an additional syntax may be used to identify which partitioning method is applied, e.g., AP1, AP2, binary, using a syntax such as flag.partitioning_symmetry or another flag.partitioning_method type of syntax. Also for the partitioning method and for either vertical or horizontal partitioning, another syntax to be encoded and signals may be a flag, e.g., flag.symmetry, indicating whether the non-QP technique will use symmetric or asymmetric partitioning, (e.g., binary partitioning or the 3:1 or 2:1 partitioning shown in FIG. 5C or 5D, respectively). For purposes of example, FIG. 6C provides both examples of the 3:1 asymmetric partitioning ("AP1") and binary partitioning in both the vertical and horizontal partitioning directions. As described above, partitioning a parent node of dimension N×N may be limited in on or more embodiments to a partitioning that produces integer division ratios between the final coding units that make up the parent node. Thus, either 3:1 AP1 partitioning or binary partitioning of the root square node are enabled, but a 2:1 partitioning is disallowed at this depth in the tree.

For partitioning signaled as a partition in the vertical or horizontal direction with asymmetric partitioning, a syntax may further be signaled to indicate which child node is the larger child node and/or which child node is the smaller child node. The example in FIG. 6C uses the syntax element named flag.split_type to indicate which type of split occurs. As described above with respect to FIGS. 5C and 5D, signaling for partitioning in the vertical directly may identify either of Type 1 (larger child node on the right) or Type 2 (larger child node on the left) for vertical partitioning. Similarly in the horizontal direction, signaling identifies either of Type 3 (larger child node on the bottom) or Type 4 (larger child node on the top).

In embodiments for which asymmetric partitioning is used, a flag may be signaled that identifies the ratio of the asymmetric split. FIG. 6C provides an example where such syntax is referred to as a flag.asymmetric_ratio. In one or more embodiments, the same syntax may be used to indicate both whether the first child node is larger than the second one and the ratio of such split. For example, the flag may identify that the partitioning operation was a 3:1 asymmetric partitioning. In one or more embodiments, the same flag may include the ratio as well as the positioning of the larger child node compared to the smaller child node (e.g., Type 1, Type 2, etc., described above), where an order of the first child and second child may be predetermined. For example, the flag.asymmetric_ratio for a vertical split could have a value 1 for a 3:1 split and value 2 for a 1:3 split, indicating a size ratio of the larger node as 3× the size of the smaller node, where the value 1 for a 3:1 ratio indicates that the child node to the left is the larger node and the value 2 for a 1:3 ratio indicates the child node to the right of the vertical split is larger.

For a 3:1 asymmetric partitioning such as that shown in FIG. 5D, a restriction imposed may be that the resulting larger child node is a restricted node. A syntax element shown as a flag.restricted flag in FIG. 6C may be a syntax included that indicates whether further partitioning is allowed or not. Thus, the flag.restricted syntax element may identify which child units are restricted, such as that shown by each of the shaded child units in FIG. 6C. The restrictions may be imposed by the rules of encoding and decoding, such as if the larger child node resulting from a 3:1 asymmetric node is disallowed from further partitioning as described above. For example, the smaller child node resulting from the Type 1 3:1 vertically partitioned node (shown as the furthest left branch in FIG. 6C) may be further partitioned using the 2:1 partitioning shown in FIG. 5D, shown as "AP2" in FIG. 6C. And the larger node resulting from the Type 1 3:1 vertically partitioned node is restricted from further partitioning and is represented as a final coding unit in the bitstream (shown as a shaded shape in the final row in FIG. 6C stemming from the left branch of the QTBT structure). Additional examples are shown in FIG. 6C where the larger child node resulting from a 3:1 asymmetric partitioning is a restricted node and is not further split before encoding and signaling.

After quadtree splitting and binary tree splitting using any of the parameters for a QTBT structure described above, the shapes represented by the QTBT's final leaf nodes may represent the final CUs 102 to be coded, such as coding using inter prediction or intra prediction. In addition, the QTBT block structure may support the feature that luma and chroma have a separate QTBT structure. Currently, for P and B slices, the luma and chroma CTBs in one CTU share the same QTBT structure. For I slices, the luma CTB is partitioned into CUs by a QTBT structure, and the chroma CTBs are partitioned into chroma CUs by another QTBT structure. In one or more embodiments, a CU in an I slice may include a coding block of the luma component or coding blocks of two chroma components. In one or more embodiments, a CU in P and B slice a CU consists of coding blocks of all three colour components. In one or more embodiments, luma and chroma trees may be shared for an I slice.

In alternate embodiments JVET can use a two-level coding block structure as an alternative to, or extension of, the QTBT partitioning described above. In the two-level coding block structure, a CTU 100 can first be partitioned at a high level into base units (BUs). The BUs can then be partitioned at a low level into operating units (OUs).

In embodiments employing the two-level coding block structure, at the high level a CTU 100 can be partitioned into BUs according to one of the QTBT structures described above, or according to a quadtree (QT) structure such as the one used in HEVC in which blocks can only be split into four equally sized sub-blocks. By way of a non-limiting example, a CTU 102 can be partitioned into BUs according to the QTBT structure described above with respect to FIGS. 5-6, such that leaf nodes in the quadtree portion can be split using quadtree partitioning, symmetric binary partitioning, or asymmetric binary partitioning. In this example, the final leaf nodes of the QTBT can be BUs instead of CUs.

At the lower level in the two-level coding block structure, each BU partitioned from the CTU 100 can be further partitioned into one or more OUs. In some embodiments, when the BU is square, it can be split into OUs using quadtree partitioning or binary partitioning, such as symmetric or asymmetric binary partitioning. However, when the BU is not square, it can be split into OUs using binary partitioning only. Limiting the type of partitioning that can be used for non-square BUs can limit the number of bits used to signal the type of partitioning used to generate BUs.

Although the discussion below describes coding CUs 102, BUs and OUs can be coded instead of CUs 102 in embodiments that use the two-level coding block structure. By way of a non-limiting examples, BUs can be used for higher level coding operations such as intra prediction or inter prediction, while the smaller OUs can be used for lower level coding operations such as transforms and generating transform coefficients. Accordingly, syntax for be coded for BUs that indicate whether they are coded with intra prediction or inter prediction, or information identifying particular intra prediction modes or motion vectors used to code the BUs. Similarly, syntax for OUs can identify particular transform operations or quantized transform coefficients used to code the OUs.

Figure 7:
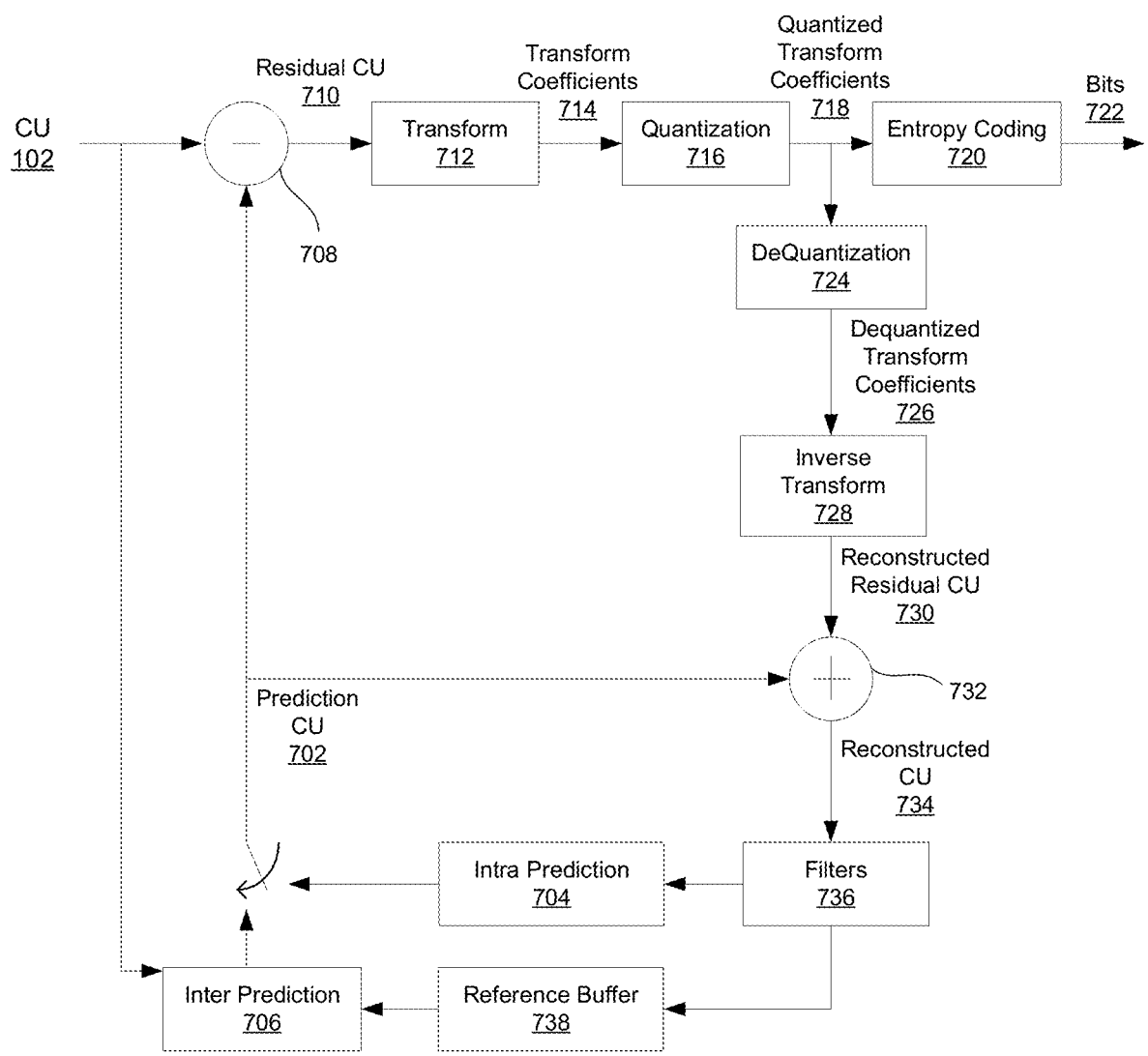
FIG. 7 depicts a simplified block diagram for CU coding in a JVET encoder.

FIG. 7 depicts a simplified diagram for CU coding in a JVET encoder, which can produce a JVET compliant bitstream. The main stages of video coding include partitioning to identify CUs 102 as described above, followed by encoding CUs 102 using prediction at 704 or 706, generation of a residual CU 710 at 708, transformation at 712, quantization at 716, and entropy coding at 720. The encoder and encoding process illustrated in FIG. 7 may also include processes that duplicate the decoding process employed by a decoder, described in more detail below, such that the encoder will generate identical predictions for subsequent data. Thus, the final picture representation may be a duplicate of the output of the decoder and stored in a reference buffer to be used for a prediction of subsequent picture.

Given a current CU 102, the encoder can obtain a prediction CU 702 either spatially using intra prediction at 704 or temporally using inter prediction at 706. The basic idea of prediction coding is to transmit a differential, or residual, signal between the original signal and a prediction for the original signal. At the receiver side, the original signal can be reconstructed by adding the residual and the prediction, as will be described below. Because the differential signal has a lower correlation than the original signal, fewer bits are needed for its transmission.

A sequence of coding units may make up a slice, and one or more slices may make up a picture. A slice may include one or more slice segments, each in its own NAL unit. A slice or slice segment may include header information for the slice or bitstream. A slice is a data structure that can be decoded independently from other slices of the same picture, in terms of entropy coding, signal prediction, and residual signal reconstruction. A slice can either be an entire picture or a region of a picture.

A slice, such as an entire picture or a portion of a picture, coded entirely with intra-predicted CUs 102 can be an I slice that can be decoded without reference to other slices, and as such can be a possible point where decoding can begin. A slice coded with at least some inter-predicted CUs can be a predictive (P or bi-predictive (B slice that can be decoded based on one or more reference pictures. P slices may use intra-prediction and inter-prediction with previously coded slices. For example, P slices may be compressed further than the I-slices by the use of inter-prediction, but need the coding of a previously coded slice to code them. B slices can use data from previous and/or subsequent slices for its coding, using intra-prediction or inter-prediction using an interpolated prediction from two different frames, thus increasing the accuracy of the motion estimation process. In some cases P slices and B slices can also or alternately be encoded using intra block copy, in which data from other portions of the same slice is used.

As will be discussed below, intra prediction or inter prediction can be performed based on reconstructed CUs 734 from previously coded CUs 102, such as neighboring CUs 102 or CUs 102 in reference pictures.

When a CU 102 is coded spatially with intra prediction at 704, an intra prediction mode can be found that best predicts pixel values of the CU 102 based on samples from neighboring CUs 102 in the picture.

Figure 8:
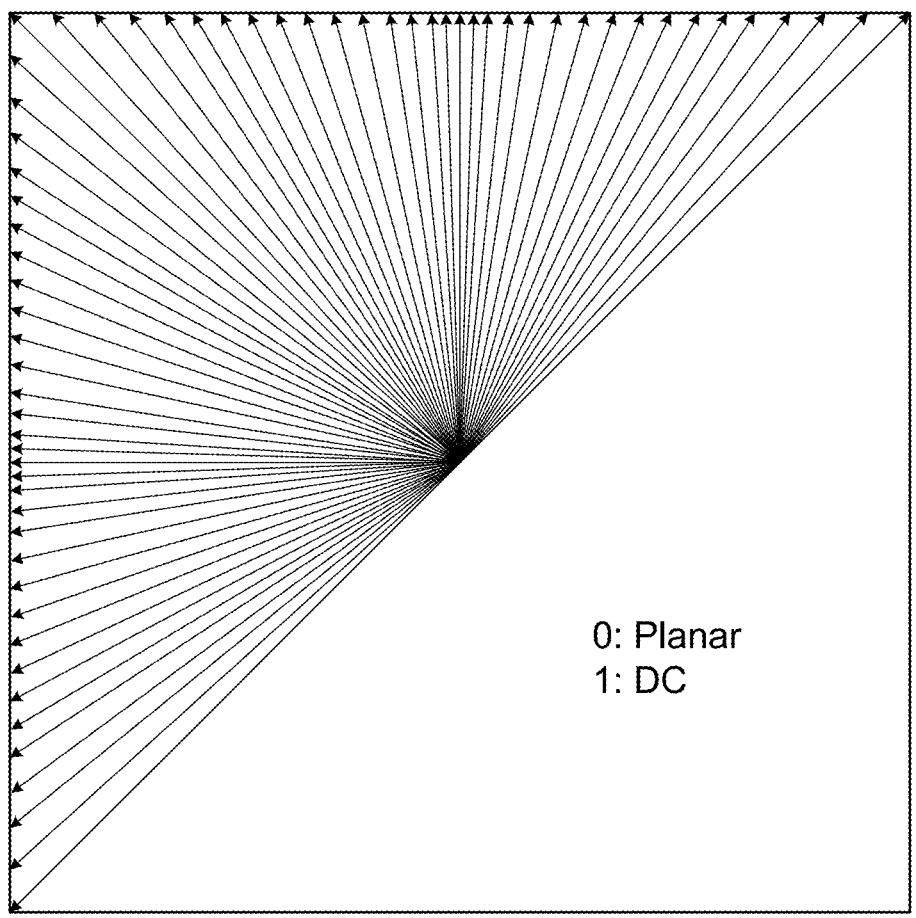
FIG. 8 depicts 67 possible intra prediction modes for luma components in JVET.

When coding a CU's luma component, the encoder can generate a list of candidate intra prediction modes. While HEVC had 35 possible intra prediction modes for luma components, in JVET there are 67 possible intra prediction modes for luma components. These include a planar mode that uses a three dimensional plane of values generated from neighboring pixels, a DC mode that uses values averaged from neighboring pixels, and the 65 directional modes shown in FIG. 8 that use values copied from neighboring pixels along the indicated directions.

When generating a list of candidate intra prediction modes for a CU's luma component, the number of candidate modes on the list can depend on the CU's size. The candidate list can include: a subset of HEVC's 35 modes with the lowest SATD (Sum of Absolute Transform Difference costs; new directional modes added for JVET that neighbor the candidates found from the HEVC modes; and modes from a set of six most probable modes (MPMs for the CU 102 that are identified based on intra prediction modes used for previously coded neighboring blocks as well as a list of default modes.

When coding a CU's chroma components, a list of candidate intra prediction modes can also be generated. The list of candidate modes can include modes generated with cross-component linear model projection from luma samples, intra prediction modes found for luma CBs in particular collocated positions in the chroma block, and chroma prediction modes previously found for neighboring blocks. The encoder can find the candidate modes on the lists with the lowest rate distortion costs, and use those intra prediction modes when coding the CU's luma and chroma components. For example, an encoder rater-distortion optimization process of the QTBT structure may be used to determine the best block partitioning shape. Syntax can be coded in the bitstream that indicates the intra prediction modes used to code each CU 102.

After the best intra prediction modes for a CU 102 have been selected, the encoder can generate a prediction CU 402 using those modes. When the selected modes are directional modes, a 4-tap filter can be used to improve the directional accuracy. Columns or rows at the top or left side of the prediction block can be adjusted with boundary prediction filters, such as 2-tap or 3-tap filters.

The prediction CU 702 can be smoothed further with a position dependent intra prediction combination (PDPC) process that adjusts a prediction CU 702 generated based on filtered samples of neighboring blocks using unfiltered samples of neighboring blocks, or adaptive reference sample smoothing using 3-tap or 5-tap low pass filters to process reference samples.

When a CU 102 is coded temporally with inter prediction at 706, a set of motion vectors (MVs) can be found that points to samples in reference pictures that best predict pixel values of the CU 102. Inter prediction exploits temporal redundancy between slices by representing a displacement of a block of pixels in a slice. The displacement is determined according to the value of pixels in previous or following slices through a process called motion compensation. Motion vectors and associated reference indices that indicate pixel displacement relative to a particular reference picture can be provided in the bitstream to a decoder, along with the residual between the original pixels and the motion compensated pixels. The decoder can use the residual and signaled motion vectors and reference indices to reconstruct a block of pixels in a reconstructed slice.

In JVET, motion vector accuracy can be stored at 1/16 pel, and the difference between a motion vector and a CU's predicted motion vector can be coded with either quarter-pel resolution or integer-pel resolution.

In JVET motion vectors can be found for multiple sub-CUs within a CU 102, using techniques such as advanced temporal motion vector prediction (ATMVP), spatial-temporal motion vector prediction (STMVP), affine motion compensation prediction, pattern matched motion vector derivation (PMMVD), and/or bi-directional optical flow (BIO).

Using ATMVP, the encoder can find a temporal vector for the CU 102 that points to a corresponding block in a reference picture. The temporal vector can be found based on motion vectors and reference pictures found for previously coded neighboring CUs 102. Using the reference block pointed to by a temporal vector for the entire CU 102, a motion vector can be found for each sub-CU within the CU 102.

STMVP can find motion vectors for sub-CUs by scaling and averaging motion vectors found for neighboring blocks previously coded with inter prediction, together with a temporal vector.

Affine motion compensation prediction can be used to predict a field of motion vectors for each sub-CU in a block, based on two control motion vectors found for the top corners of the block. For example, motion vectors for sub-CUs can be derived based on top corner motion vectors found for each 4×4 block within the CU 102.

PMMVD can find an initial motion vector for the current CU 102 using bilateral matching or template matching. Bilateral matching can look at the current CU 102 and reference blocks in two different reference pictures along a motion trajectory, while template matching can look at corresponding blocks in the current CU 102 and a reference picture identified by a template. The initial motion vector found for the CU 102 can then be refined individually for each sub-CU.

BIO can be used when inter prediction is performed with bi-prediction based on earlier and later reference pictures, and allows motion vectors to be found for sub-CUs based on the gradient of the difference between the two reference pictures.

In some situations local illumination compensation (LIC) can be used at the CU level to find values for a scaling factor parameter and an offset parameter, based on samples neighboring the current CU 102 and corresponding samples neighboring a reference block identified by a candidate motion vector. In JVET, the LIC parameters can change and be signaled at the CU level.

For some of the above methods the motion vectors found for each of a CU's sub-CUs can be signaled to decoders at the CU level. For other methods, such as PMMVD and BIO, motion information is not signaled in the bitstream to save overhead, and decoders can derive the motion vectors through the same processes.

After the motion vectors for a CU 102 have been found, the encoder can generate a prediction CU 702 using those motion vectors. In some cases, when motion vectors have been found for individual sub-CUs, Overlapped Block Motion Compensation (OBMC) can be used when generating a prediction CU 702 by combining those motion vectors with motion vectors previously found for one or more neighboring sub-CUs.

When bi-prediction is used, JVET can use decoder-side motion vector refinement (DMVR) to find motion vectors. DMVR allows a motion vector to be found based on two motion vectors found for bi-prediction using a bilateral template matching process. In DMVR, a weighted combination of prediction CUs 702 generated with each of the two motion vectors can be found, and the two motion vectors can be refined by replacing them with new motion vectors that best point to the combined prediction CU 702. The two refined motion vectors can be used to generate the final prediction CU 702.

At 708, once a prediction CU 702 has been found with intra prediction at 704 or inter prediction at 706 as described above, the encoder can subtract the prediction CU 702 from the current CU 102 find a residual CU 710.

The encoder can use one or more transform operations at 712 to convert the residual CU 710 into transform coefficients 714 that express the residual CU 710 in a transform domain, such as using a discrete cosine block transform (DCT-transform) to convert data into the transform domain. JVET allows more types of transform operations than HEVC, including DCT-II, DST-VII, DST-VII, DCT-VIII, DST-I, and DCT-V operations. The allowed transform operations can be grouped into sub-sets, and an indication of which sub-sets and which specific operations in those sub-sets were used can be signaled by the encoder. In some cases, large block-size transforms can be used to zero out high frequency transform coefficients in CUs 102 larger than a certain size, such that only lower-frequency transform coefficients are maintained for those CUs 102.

In some cases a mode dependent non-separable secondary transform (MDNSST) can be applied to low frequency transform coefficients 714 after a forward core transform. The MDNSST operation can use a Hypercube-Givens Transform (HyGT) based on rotation data. When used, an index value identifying a particular MDNSST operation can be signaled by the encoder.

At 716, the encoder can quantize the transform coefficients 714 into quantized transform coefficients 716. The quantization of each coefficient may be computed by dividing a value of the coefficient by a quantization step, which is derived from a quantization parameter (QP). In some embodiments, the Qstep is defined as $2^{(QP-4)/6}$. Because high precision transform coefficients 714 can be converted into quantized transform coefficients 716 with a finite number of possible values, quantization can assist with data compression. Thus, quantization of the transform coefficients may limit an amount of bits generated and sent by the transformation process. However, while quantization is a lossy operation, and the loss by quantization cannot be recovered, the quantization process presents a trade-off between quality of the reconstructed sequence and an amount of information needed to represent the sequence. For example, a lower QP value can result in better quality decoded video, although a higher amount of data may be required for representation and transmission. In contrast, a high QP value can result in lower quality reconstructed video sequences but with lower data and bandwidth needs.

JVET can utilize variance-based adaptive quantization techniques, which allows every CU 102 to use a different quantization parameter for its coding process (instead of using the same frame QP in the coding of every CU 102 of the frame). The variance-based adaptive quantization techniques adaptively lowers the quantization parameter of certain blocks while increasing it in others. To select a specific QP for a CU 102, the CU's variance is computed. In brief, if a CU's variance is higher than the average variance of the frame, a higher QP than the frame's QP may be set for the CU 102. If the CU 102 presents a lower variance than the average variance of the frame, a lower QP may be assigned.

At 720, the encoder can find final compression bits 722 by entropy coding the quantized transform coefficients 718. Entropy coding aims to remove statistical redundancies of the information to be transmitted. In JVET, CABAC (Context Adaptive Binary Arithmetic Coding) can be used to code the quantized transform coefficients 718, which uses probability measures to remove the statistical redundancies. For CUs 102 with non-zero quantized transform coefficients 718, the quantized transform coefficients 718 can be converted into binary. Each bit ("bin") of the binary representation can then be encoded using a context model. A CU 102 can be broken up into three regions, each with its own set of context models to use for pixels within that region.

Multiple scan passes can be performed to encode the bins. During passes to encode the first three bins (bin0, bin 1, and bin2), an index value that indicates which context model to use for the bin can be found by finding the sum of that bin position in up to five previously coded neighboring quantized transform coefficients 718 identified by a template.

A context model can be based on probabilities of a bin's value being '0' or '1'. As values are coded, the probabilities in the context model can be updated based on the actual number of '0' and '1' values encountered. While HEVC used fixed tables to re-initialize context models for each new picture, in JVET the probabilities of context models for new inter-predicted pictures can be initialized based on context models developed for previously coded inter-predicted pictures.

The encoder can produce a bitstream that contains entropy encoded bits 722 of residual CUs 710, prediction information such as selected intra prediction modes or motion vectors, indicators of how the CUs 102 were partitioned from a CTU 100 according to the QTBT structure, and/or other information about the encoded video. The bitstream can be decoded by a decoder as discussed below.

In addition to using the quantized transform coefficients 718 to find the final compression bits 722, the encoder can also use the quantized transform coefficients 718 to generate reconstructed CUs 734 by following the same decoding process that a decoder would use to generate reconstructed CUs 734. Thus, once the transformation coefficients have been computed and quantized by the encoder, the quantized transform coefficients 718 may be transmitted to the decoding loop in the encoder. After quantization of a CU's transform coefficients, a decoding loop allows the encoder to generate a reconstructed CU 734 identical to the one the decoder generates in the decoding process. Accordingly, the encoder can use the same reconstructed CUs 734 that a decoder would use for neighboring CUs 102 or reference pictures when performing intra prediction or inter prediction for a new CU 102. Reconstructed CUs 102, reconstructed slices, or full reconstructed frames may serve as references for further prediction stages.

At the encoder's decoding loop (and see below, for the same operations in the decoder) to obtain pixel values for the reconstructed image, a dequantization process may be performed. To dequantize a frame, for example, a quantized value for each pixel of a frame is multiplied by the quantization step, e.g., (Qstep) described above, to obtain reconstructed dequantized transform coefficients 726. For example, in the decoding process shown in FIG. 7 in the encoder, the quantized transform coefficients 718 of a residual CU 710 can be dequantized at 724 to find dequantized transform coefficients 726. If an MDNSST operation was performed during encoding, that operation can be reversed after dequantization.

At 728, the dequantized transform coefficients 726 can be inverse transformed to find a reconstructed residual CU 730, such as by applying a DCT to the values to obtain the reconstructed image. At 732 the reconstructed residual CU 730 can be added to a corresponding prediction CU 702 found with intra prediction at 704 or inter prediction at 706, in order to find a reconstructed CU 734. While in some embodiments the encoder can perform intra prediction at 704 as described above, in other embodiments the encoder can follow the process disclosed herein for intra prediction template matching to generate a prediction CU 702 in the same way that a decoder would use template matching for intra prediction if information identifying the intra prediction mode used for the CU 102 is omitted from the bitstream.

At 736, one or more filters can be applied to the reconstructed data during the decoding process (in the encoder or, as described below, in the decoder), at either a picture level or CU level. For example, the encoder can apply a deblocking filter, a sample adaptive offset (SAO) filter, and/or an adaptive loop filter (ALF). The encoder's decoding process may implement filters to estimate and transmit to a decoder the optimal filter parameters that can address potential artifacts in the reconstructed image. Such improvements increase the objective and subjective quality of the reconstructed video. In deblocking filtering, pixels near a sub-CU boundary may be modified, whereas in SAO, pixels in a CTU 100 may be modified using either an edge offset or band offset classification. JVET's ALF can use filters with circularly symmetric shapes for each 2×2 block. An indication of the size and identity of the filter used for each 2×2 block can be signaled.

If reconstructed pictures are reference pictures, they can be stored in a reference buffer 738 for inter prediction of future CUs 102 at 706.

During the above steps, JVET allows a content adaptive clipping operations to be used to adjust color values to fit between lower and upper clipping bounds. The clipping bounds can change for each slice, and parameters identifying the bounds can be signaled in the bitstream.

Figure 9:
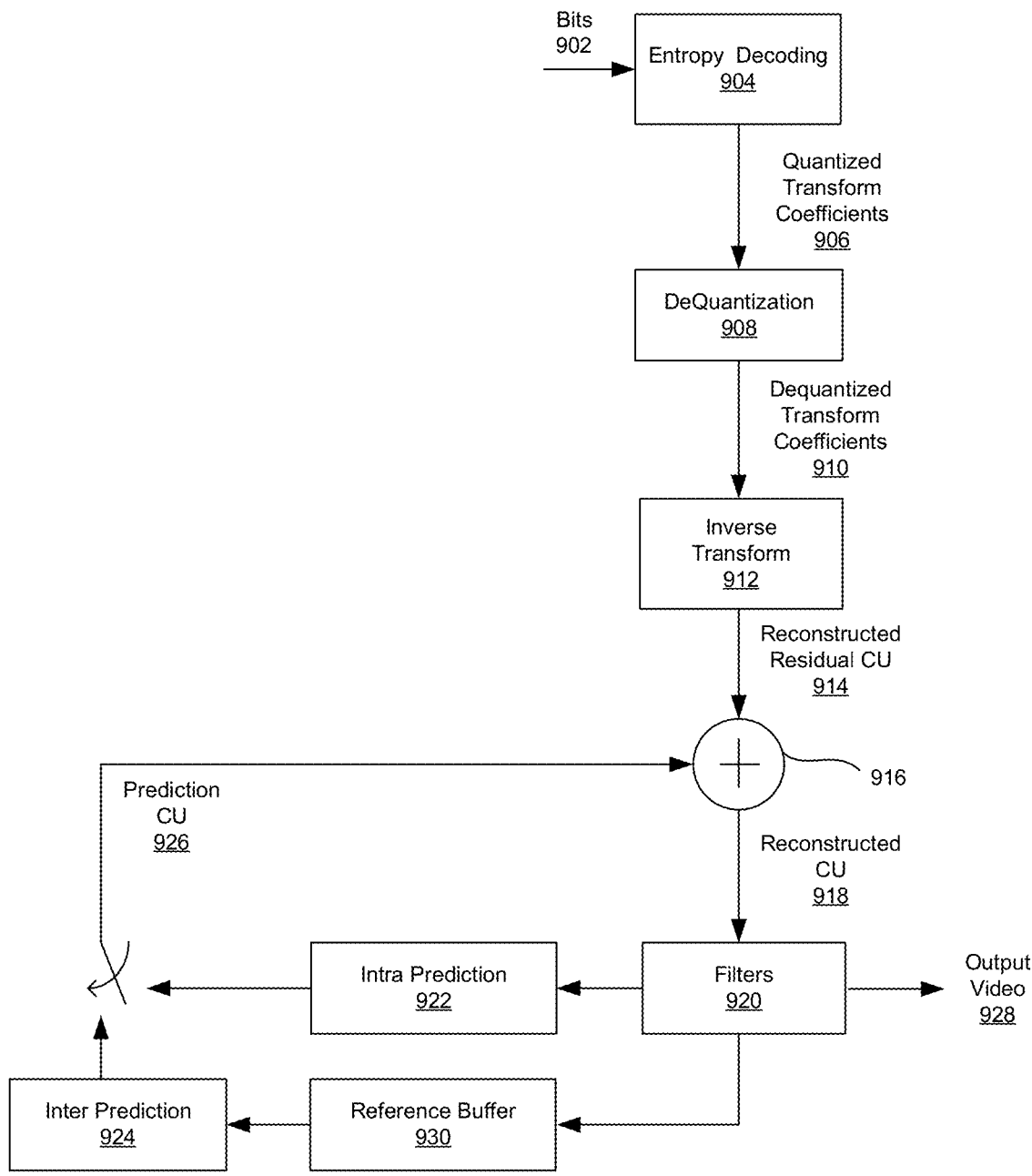
FIG. 9 depicts a simplified block diagram for CU coding in a JVET decoder.

FIG. 9 depicts a simplified block diagram for CU coding in a JVET decoder. A decoder is an embodiment of a decoding process, which is a process specified for JVET that reads a bitstream and derives decoded pictures from it. A process in this context describes the decoding of syntax elements. A bitstream conforming to JVET may include slice segment data for each coding tree unit of a coded picture, such that the division of the pictures into slices or slice segments and then into coding tree units may form the partitioning of the picture. The coded picture may be a coded representation of a picture. In one or more embodiments, the coded picture may comprise VCL NAL units with a particular value within an access unit, and may include all of the coding tree units in the picture.

As described above, FIG. 3 is one example of a coding tree representation that is provided via syntax elements in the bitstream to the decoder, where the decoder can recreate the partition of the coding tree unit based on each child node, and parent coding unit represented by the syntax in the bitstream. Thus, the decoding process may be invoked when parsing slice segment data syntax or coding tree unit syntax.

A JVET decoder can receive a bitstream containing information about encoded CUs 102. The bitstream can indicate how CUs 102 of a picture were partitioned from a CTU 100 according to a QTBT structure. By way of a non-limiting example, the bitstream can identify how CUs 102 were partitioned from each CTU 100 in a QTBT using quadtree partitioning, symmetric binary partitioning, and/or asymmetric binary partitioning. The bitstream can also indicate prediction information for the CUs 102 such as intra prediction modes or motion vectors, and bits 902 representing entropy encoded residual CUs. In some embodiments the encoder can have omitted information in the bitstream about intra prediction modes used to encode some or all CUs 102 coded using intra prediction, and as such the decoder can use template matching for intra prediction as described below with respect to the following figures.

At 904 the decoder can decode the entropy encoded bits 902 using the CABAC context models signaled in the bitstream by the encoder. The decoder can use parameters signaled by the encoder to update the context models' probabilities in the same way they were updated during encoding.

After reversing the entropy encoding at 904 to find quantized transform coefficients 906, the decoder can dequantize them at 908 to find dequantized transform coefficients 910. If an MDNSST operation was performed during encoding, that operation can be reversed by the decoder after dequantization.

At 912, the dequantized transform coefficients 910 can be inverse transformed to find a reconstructed residual CU 914. At 916, the reconstructed residual CU 914 can be added to a corresponding prediction CU 926 found with intra prediction at 922 or inter prediction at 924, in order to find a reconstructed CU 918.

At 920, one or more filters can be applied to the reconstructed data, at either a picture level or CU level. For example, the decoder can apply a deblocking filter, a sample adaptive offset (SAO filter, and/or an adaptive loop filter (ALF. As described above, the in-loop filters located in the decoding loop of the encoder may be used to estimate optimal filter parameters to increase the objective and subjective quality of a frame. These parameters are transmitted to the decoder to filter the reconstructed frame at 920 to match the filtered reconstructed frame in the encoder.

After reconstructed pictures have been generated by finding reconstructed CUs 918 and applying signaled filters, the decoder can output the reconstructed pictures as output video 928. If reconstructed pictures are to be used as reference pictures, they can be stored in a reference buffer 930 for inter prediction of future CUs 102 at 924.

Figure 10:
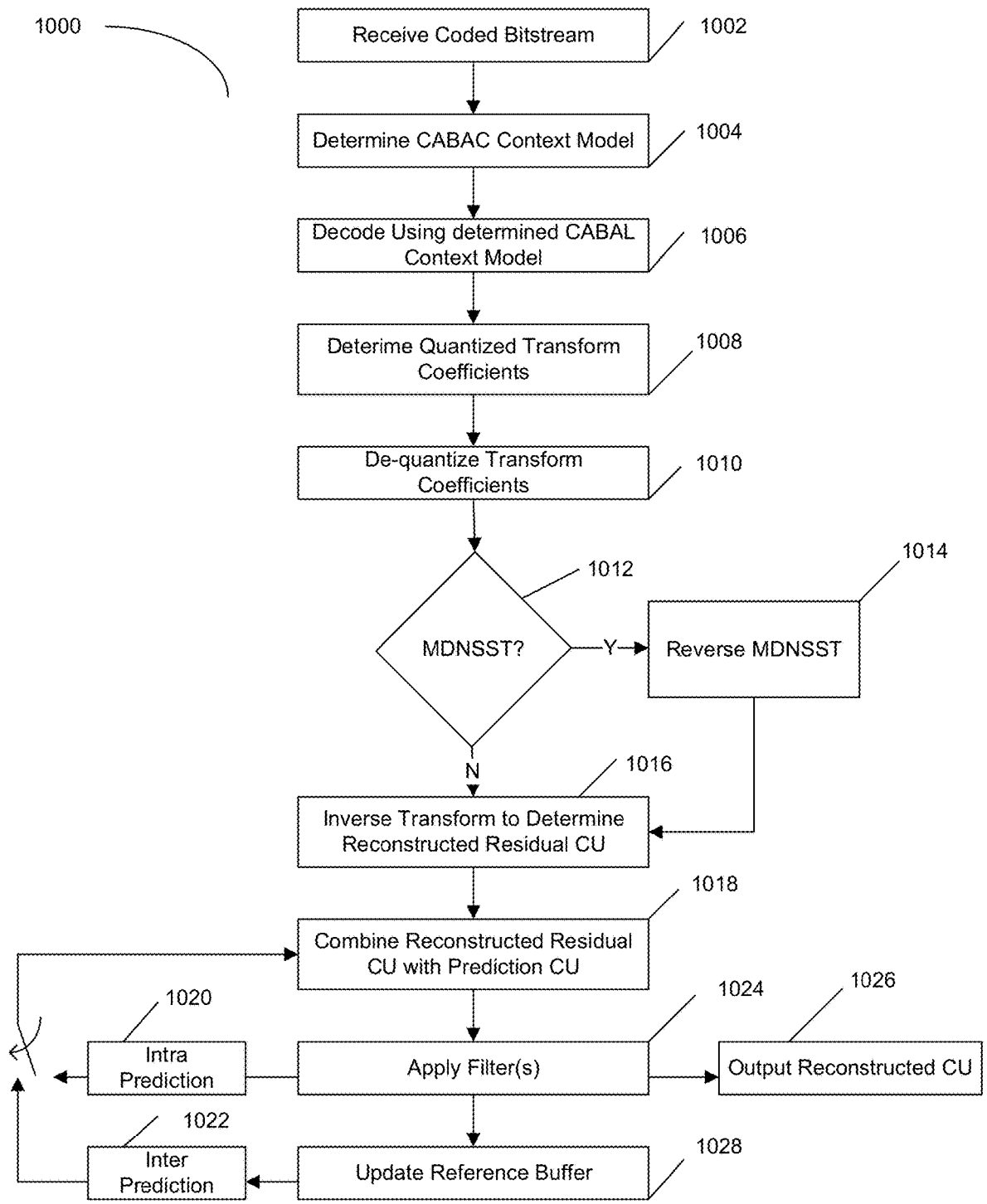
FIG. 10 depicts an embodiment of a method of CU coding in a JVET decoder.

FIG. 10 depicts an embodiment of a method of CU coding 1000 in a JVET decoder. In the embodiment depicted in FIG. 10, in step 1002 an encoded bitstream 902 can be received and then in step 1004 the CABAC context model associated with the encoded bitstream 902 can be determined and the encoded bitstream 902 can then be decoded using the determined CABAC context model in step 1006.

In step 1008, the quantized transform coefficients 906 associated with the encoded bitstream 902 can be determined and de-quantized transform coefficients 910 can then be determined from the quantized transform coefficients 906 in step 1010.

In step 1012, it can be determined whether an MDNSST operation was performed during encoding and/or if the bitstream 902 contains indications that an MDNSST operation was applied to the bitstream 902. If it is determined that an MDNSST operation was performed during the encoding process or the bitstream 902 contains indications that an MDNSST operation was applied to the bitstream 902, then an inverse MDNSST operation 1014 can be implemented before an inverse transform operation 912 is performed on the bitstream 902 in step 1016. Alternately, an inverse transform operation 912 can be performed on the bitstream 902 in step 1016 absent application of an inverse MDNSST operation in step 1014. The inverse transform operation 912 in step 1016 can determine and/or construct a reconstructed residual CU 914.

In step 1018, the reconstructed residual CU 914 from step 1016 can be combined with a prediction CU 918. The prediction CU 918 can be one of an intra-prediction CU 922 determined in step 1020 and an inter-prediction unit 924 determined in step 1022.

In step 1024, any one or more filters 920 can be applied to the reconstructed CU 914 and output in step 1026. In some embodiments filters 920 may not be applied in step 1024.

In some embodiments, in step 1028, the reconstructed CU 918 can be stored in a reference buffer 930.

Figure 11:
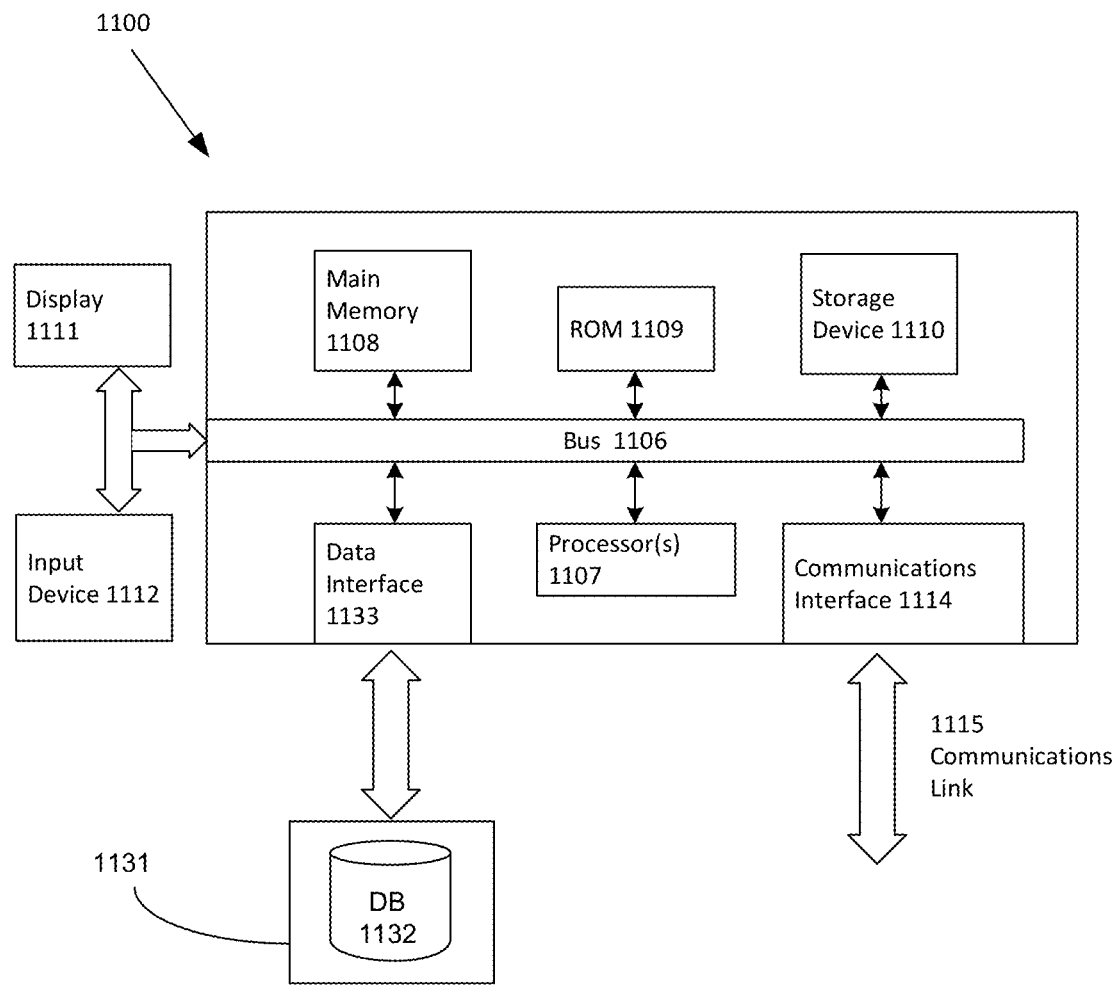
FIG. 11 depicts an embodiment of a computer system adapted and/or configured to process a method of CU coding.

The execution of the sequences of instructions required to practice the embodiments can be performed by a computer system 1100 as shown in FIG. 11. In an embodiment, execution of the sequences of instructions is performed by a single computer system 1100. According to other embodiments, two or more computer systems 1100 coupled by a communication link 1115 can perform the sequence of instructions in coordination with one another. Although a description of only one computer system 1100 will be presented below, however, it should be understood that any number of computer systems 1100 can be employed to practice the embodiments.

A computer system 1100 according to an embodiment will now be described with reference to FIG. 11, which is a block diagram of the functional components of a computer system 1100. As used herein, the term computer system 1100 is broadly used to describe any computing device that can store and independently run one or more programs.

Each computer system 1100 can include a communication interface 1114 coupled to the bus 1106. The communication interface 1114 provides two-way communication between computer systems 1100. The communication interface 1114 of a respective computer system 1100 transmits and receives electrical, electromagnetic or optical signals, which include data streams representing various types of signal information, e.g., instructions, messages and data. A communication link 1115 links one computer system 1100 with another computer system 1100. For example, the communication link 1115 can be a LAN, in which case the communication interface 1114 can be a LAN card, or the communication link 1115 can be a PSTN, in which case the communication interface 1114 can be an integrated services digital network (ISDN) card or a modem, or the communication link 1115 can be the Internet, in which case the communication interface 1114 can be a dial-up, cable or wireless modem.

A computer system 1100 can transmit and receive messages, data, and instructions, including program, i.e., application, code, through its respective communication link 1115 and communication interface 1114. Received program code can be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals, which include data streams representing various types of signal information, e.g., instructions, messages and data. In embodiments, the functions of the data interface 1133 can be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM or other dynamic storage device, coupled to the bus 1106 for storing dynamic data and instructions to be executed by the processor(s 1107. The main memory 1108 also can be used for storing temporary data, i.e., variables, or other intermediate information during execution of instructions by the processor(s 1107.

The computer system 1100 can further include a read only memory (ROM 1109 or other static storage device coupled to the bus 1106 for storing static data and instructions for the processor(s 1107. A storage device 1110, such as a magnetic disk or optical disk, can also be provided and coupled to the bus 1106 for storing data and instructions for the processor(s 1107.

A computer system 1100 can be coupled via the bus 1106 to a display device 1111, such as, but not limited to, a cathode ray tube (CRT or a liquid-crystal display (LCD monitor, for displaying information to a user. An input device 1112, e.g., alphanumeric and other keys, is coupled to the bus 1106 for communicating information and command selections to the processor(s) 1107.

According to one embodiment, an individual computer system 1100 performs specific operations by their respective processor(s) 1107 executing one or more sequences of one or more instructions contained in the main memory 1108. Such instructions can be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry can be used in place of or in combination with software instructions. Thus, embodiments are not limited to any specific combination of hardware circuitry and/or software.

The term "computer-usable medium," as used herein, refers to any medium that provides information or is usable by the processor(s) 1107. Such a medium can take many forms, including, but not limited to, non-volatile, volatile and transmission media. Non-volatile media, i.e., media that can retain information in the absence of power, includes the ROM 1109, CD ROM, magnetic tape, and magnetic discs.

Volatile media, i.e., media that cannot retain information in the absence of power, includes the main memory 1108. Transmission media includes coaxial cables, copper wire and fiber optics, including the wires that comprise the bus 1106. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications. In the foregoing specification, the embodiments have been described with reference to specific elements thereof. It will, however, be evident that various modifications and changes can be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense It should also be noted that the present invention can be implemented in a variety of computer systems. The various techniques described herein can be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language can be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system can also be considered to be implemented as a computer-readable storage medium, configured with a computer program, where the storage medium so configured causes a computer to operate in a specific and predefined manner. Further, the storage elements of the exemplary computing applications can be relational or sequential (flat file) type computing databases that are capable of storing data in various combinations and configurations.

Figure 12:
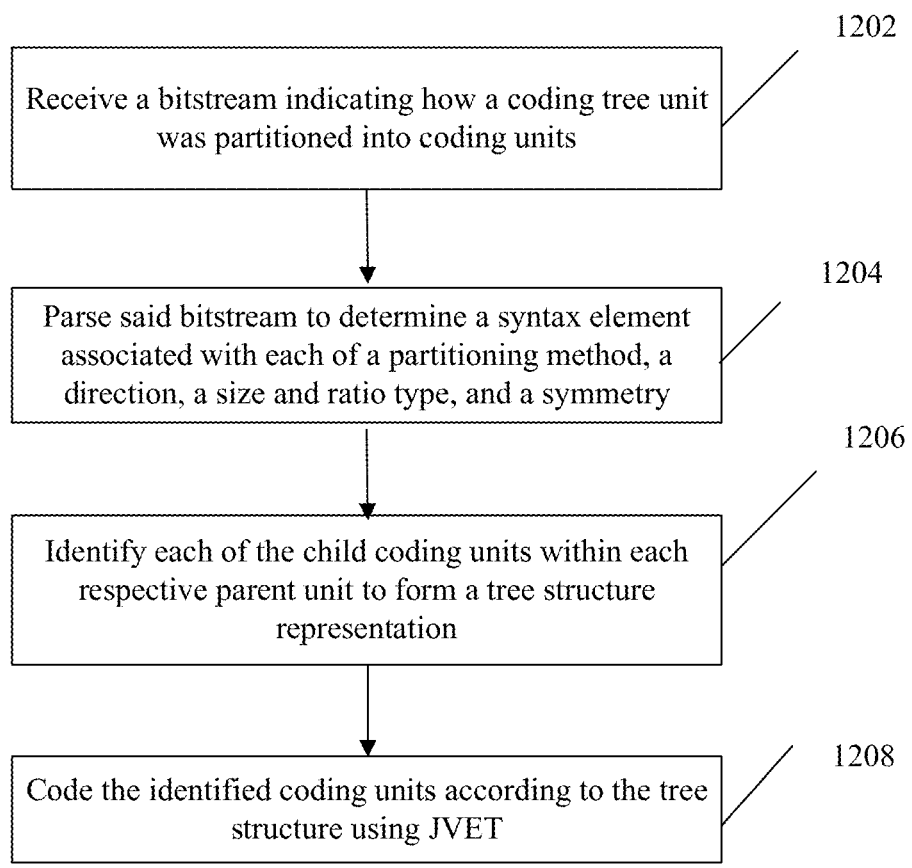
FIG. 12 is a flow diagram that illustrates a method for performing the disclosed techniques.

FIG. 12 is a flow diagram that illustrates a method for performing the disclosed techniques, but it should be understood that the techniques described herein with respect to the remaining figures similarly capture the methods available using the disclosed techniques. As illustrated in FIG. 12, a JVET encoder or decoder, such as those described in FIGS. 7, 9, and 13, may receive a bitstream at 1202 indicating how a coding tree unit was partitioned in to coding units, such as a bitstream with a syntax structure such as that shown in FIG. 6C. At 1204, the encoder or decoder may parse the bitstream to determine a syntax structure associated with each of a partitioning method (e.g., binary, quadtree), a partitioning type (e.g., a vertical or horizontal split in which type shown in FIG. 5, for example), a symmetry, a size, ratio, etc. At 1206, the encoder or decoder can identify each of the child coding units within each respective parent unit to form a tree structure representation. At 1208, the encoder may encode the coding units according to the tree structure to provide to a decoder, or the encoder may provide the encoding coding units to an internal decoding process as described with respect to FIG. 7. At 1208, a decoder may decode the identified coding units according to the tree structure using JVET processes.

Figure 13:
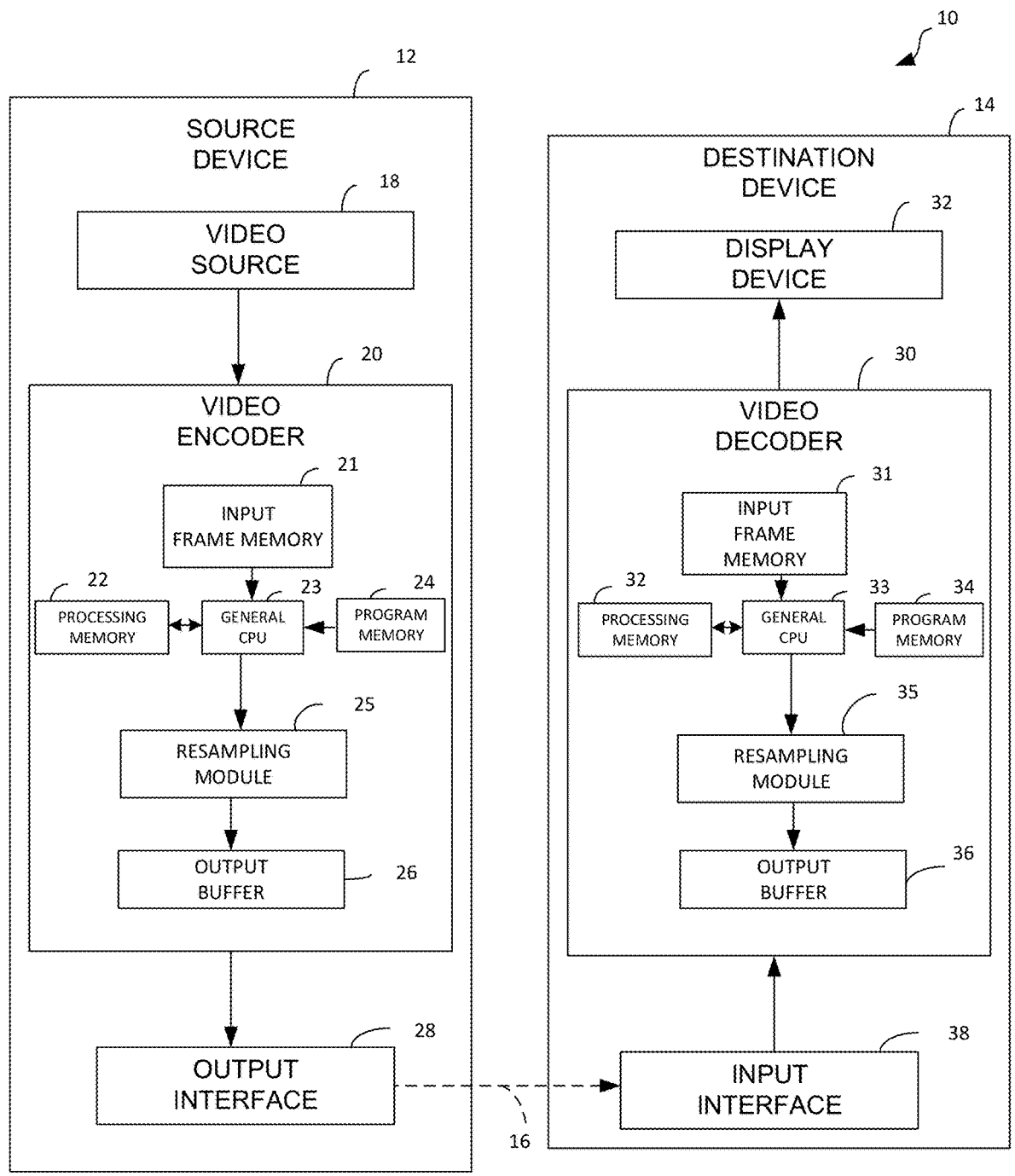
FIG. 13 is a high level view of a source device and destination device that may incorporate features of the systems and devices described herein.

FIG. 13 is a high level view of a source device 12 and destination device 10 that may incorporate features of the systems and devices described herein. As shown in FIG. 13, example video coding system 10 includes a source device 12 and a destination device 14 where, in this example, the source device 12 generates encoded video data. Accordingly, source device 12 may be referred to as a video encoding device. Destination device 14 may decode the encoded video data generated by source device 12. Accordingly, destination device 14 may be referred to as a video decoding device. Source device 12 and destination device 14 may be examples of video coding devices.

Destination device 14 may receive encoded video data from source device 12 via a channel 16. Channel 16 may comprise a type of medium or device capable of moving the encoded video data from source device 12 to destination device 14. In one example, channel 16 may comprise a communication medium that enables source device 12 to transmit encoded video data directly to destination device 14 in real-time.

In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14. In another example, channel 16 may correspond to a storage medium that stores the encoded video data generated by source device 12.

In the example of FIG. 13, source device 12 includes a video source 18, video encoder 20, and an output interface 22. In some cases, output interface 28 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may encode the captured, pre-captured, or computer-generated video data. An input image may be received by the video encoder 20 and stored in the input frame memory 21. The general purpose processor 23 may load information from here and perform encoding. The program for driving the general purpose processor may be loaded from a storage device, such as the example memory modules depicted in FIG. 13. The general purpose processor may use processing memory 22 to perform the encoding, and the output of the encoding information by the general processor may be stored in a buffer, such as output buffer 26.

The video encoder 20 may include a resampling module 25 which may be configured to code (e.g., encode) video data in a scalable video coding scheme that defines at least one base layer and at least one enhancement layer. Resampling module 25 may resample at least some video data as part of an encoding process, wherein resampling may be performed in an adaptive manner using resampling filters.

The encoded video data, e.g., a coded bit stream, may be transmitted directly to destination device 14 via output interface 28 of source device 12. In the example of FIG. 13, destination device 14 includes an input interface 38, a video decoder 30, and a display device 32. In some cases, input interface 28 may include a receiver and/or a modem. Input interface 38 of destination device 14 receives encoded video data over channel 16. The encoded video data may include a variety of syntax elements generated by video encoder 20 that represent the video data. Such syntax elements may be included with the encoded video data transmitted on a communication medium, stored on a storage medium, or stored a file server.

The encoded video data may also be stored onto a storage medium or a file server for later access by destination device 14 for decoding and/or playback. For example, the coded bitstream may be temporarily stored in the input buffer 31, then loaded in to the general purpose processor 33. The program for driving the general purpose processor may be loaded from a storage device or memory. The general purpose processor may use a process memory 32 to perform the decoding. The video decoder 30 may also include a resampling module 35 similar to the resampling module 25 employed in the video encoder 20.

FIG. 13 depicts the resampling module 35 separately from the general purpose processor 33, but it would be appreciated by one of skill in the art that the resampling function may be performed by a program executed by the general purpose processor, and the processing in the video encoder may be accomplished using one or more processors. The decoded image(s may be stored in the output frame buffer 36 and then sent out to the input interface 38.

Display device 38 may be integrated with or may be external to destination device 14. In some examples, destination device 14 may include an integrated display device and may also be configured to interface with an external display device. In other examples, destination device 14 may be a display device. In general, display device 38 displays the decoded video data to a user.

Video encoder 20 and video decoder 30 may operate according to a video compression standard. ITU-T VCEG (Q6/16 and ISO/IEC MPEG (JTC 1/SC 29/WG 11 are studying the potential need for standardization of future video coding technology with a compression capability that significantly exceeds that of the current High Efficiency Video Coding HEVC standard (including its current extensions and near-term extensions for screen content coding and high-dynamic-range coding. The groups are working together on this exploration activity in a joint collaboration effort known as the Joint Video Exploration Team (JVET to evaluate compression technology designs proposed by their experts in this area. A recent capture of JVET development is described in the "Algorithm Description of Joint Exploration Test Model 5 (JEM 5)", JVET-E1001-V2, authored by J. Chen, E. Alshina, G. Sullivan, J. Ohm, J. Boyce.

Additionally or alternatively, video encoder 20 and video decoder 30 may operate according to other proprietary or industry standards that function with the disclosed JVET features. Thus, other standards such as the ITU-T H.264 standard, alternatively referred to as MPEG-4, Part 10, Advanced Video Coding (AVC), or extensions of such standards. Thus, while newly developed for JVET, techniques of this disclosure are not limited to any particular coding standard or technique. Other examples of video compression standards and techniques include MPEG-2, ITU-T H.263 and proprietary or open source compression formats and related formats.

Video encoder 20 and video decoder 30 may be implemented in hardware, software, firmware or any combination thereof. For example, the video encoder 20 and decoder 30 may employ one or more processors, digital signal processors (DSPs), application specific integrated circuits (ASICs), field programmable gate arrays (FPGAs), discrete logic, or any combinations thereof. When the video encoder 20 and decoder 30 are implemented partially in software, a device may store instructions for the software in a suitable, non-transitory computer-readable storage medium and may execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

Aspects of the subject matter described herein may be described in the general context of computer-executable instructions, such as program modules, being executed by a computer, such as the general purpose processors 23 and 33 described above. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Examples of memory include random access memory (RAM), read only memory (ROM), or both. Memory may store instructions, such as source code or binary code, for performing the techniques described above. Memory may also be used for storing variables or other intermediate information during execution of instructions to be executed by a processor, such as processor 23 and 33.

A storage device may also store instructions, instructions, such as source code or binary code, for performing the techniques described above. A storage device may additionally store data used and manipulated by the computer processor. For example, a storage device in a video encoder 20 or a video decoder 30 may be a database that is accessed by computer system 23 or 33. Other examples of storage device include random access memory (RAM), read only memory (ROM), a hard drive, a magnetic disk, an optical disk, a CD-ROM, a DVD, a flash memory, a USB memory card, or any other medium from which a computer can read.

A memory or storage device may be an example of a non-transitory computer-readable storage medium for use by or in connection with the video encoder and/or decoder. The non-transitory computer-readable storage medium contains instructions for controlling a computer system to be configured to perform functions described by particular embodiments. The instructions, when executed by one or more computer processors, may be configured to perform that which is described in particular embodiments.

Also, it is noted that some embodiments have been described as a process which can be depicted as a flow diagram or block diagram. Although each may describe the operations as a sequential process, many of the operations can be performed in parallel or concurrently. In addition, the order of the operations may be rearranged. A process may have additional steps not included in the figures.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Although the subject matter has been described in language specific to structural features and/or methodological acts, it is to be understood that the subject matter defined in the appended claims is not necessarily limited to the specific features or acts described above.

Although embodiments have been disclosed herein in detail and in language specific to structural features and/or methodological acts above, it is to be understood that those skilled in the art will readily appreciate that many additional modifications are possible in the exemplary embodiments without materially departing from the novel teachings and advantages of the invention. Moreover, it is to be understood that the subject matter defined in the appended claims is not necessarily limited to the specific features or acts described above. Accordingly, these and all such modifications are intended to be included within the scope of this invention construed in breadth and scope in accordance with the appended claims.

The invention claimed is:

1. A method for decoding a bitstream using one or more processors, the method comprising:
(a) receiving said bitstream indicating how a coding tree unit is partitioned into final coding units according to a partitioning structure where a square parent block is split with quadtree partitioning that splits said square parent node in half in both horizontal and vertical directions to define four blocks as leaf nodes that are square in shape each of which are the same size, where a first square leaf node as a result of said quadtree partitioning is split with symmetric binary partitioning that splits said first square leaf node in half in either a horizontal direction or a vertical direction resulting in two rectangular blocks that are the same size as leaf nodes where one of said rectangular leaf nodes of said symmetric binary partitioning is further split with symmetric binary partitioning resulting in two blocks that are the same size as leaf nodes, and where a second square leaf node as a result of said quadtree partitioning is split with asymmetric partitioning that splits said second square leaf node in either a horizontal direction or a vertical direction resulting in a plurality of blocks that are different sizes as leaf nodes where one of said leaf nodes of said asymmetric partitioning is further split with asymmetric partitioning resulting in a plurality of blocks that are different sizes as leaf nodes, where a third square leaf node as a result of said quadtree partitioning is split with symmetric binary partitioning that splits said third square leaf node in half in either a horizontal direction or a vertical direction resulting in two blocks that are the same size as leaf nodes where one of said leaf nodes of said symmetric binary partitioning is further split with asymmetric partitioning resulting in a plurality of blocks that are different sizes as leaf nodes, where a fourth square leaf node as a result of said quadtree partitioning is split with asymmetric partitioning that splits said fourth square leaf node resulting in a plurality of blocks that are different sizes as leaf nodes where one of said leaf nodes of said asymmetric partitioning is further split in half in either a horizontal direction or a vertical direction resulting in two blocks that are the same size as leaf nodes, defining final coding units of said coding tree unit where at least one of said final coding units is square in shape and at least one of said final coding units is rectangular in shape;
(b) parse said bitstream that includes each final coding unit, wherein said bitstream conforms to the following:
recursive asymmetric partitioning of the blocks of the coding tree unit is allowed;
recursive symmetric binary partitioning of the blocks of the coding tree unit is allowed;
a leaf node of said square parent block partitioned by said quadtree partitioning is partitionable via, any one of, selected from a group including quadtree partitioning, symmetric binary partitioning, and asymmetric partitioning;
at least one leaf node partitioned using asymmetric partitioning is not permitted to be further partitioned;
at least one leaf node partitioned using symmetric binary partitioning is not permitted to be further partitioned;
(c) identifying said final coding units to be decoded;
(d) decoding the identified final coding units in accordance with an intra decoding process.

2. A method for encoding a bitstream using one or more processors, the method comprising:
(a) providing said bitstream indicating how a coding tree unit is partitioned into final coding units according to a partitioning structure where a square parent block is split with quadtree partitioning that splits said square parent node in half in both horizontal and vertical directions to define four blocks as leaf nodes that are square in shape each of which are the same size, where a first square leaf node as a result of said quadtree partitioning is split with symmetric binary partitioning that splits said first square leaf node in half in either a horizontal direction or a vertical direction resulting in two rectangular blocks that are the same size as leaf nodes where one of said rectangular leaf nodes of said symmetric binary partitioning is further split with symmetric binary partitioning resulting in two blocks that are the same size as leaf nodes, and where a second square leaf node as a result of said quadtree partitioning is split with asymmetric partitioning that splits said second square leaf node in either a horizontal direction or a vertical direction resulting in a plurality of blocks that are different sizes as leaf nodes where one of said leaf nodes of said asymmetric partitioning is further split with asymmetric partitioning resulting in a plurality of blocks that are different sizes as leaf nodes, where a third square leaf node as a result of said quadtree partitioning is split with symmetric binary partitioning that splits said third square leaf node in half in either a horizontal direction or a vertical direction resulting in two blocks that are the same size as leaf nodes where one of said leaf nodes of said symmetric binary partitioning is further split with asymmetric partitioning resulting in a plurality of blocks that are different sizes as leaf nodes, where a fourth square leaf node as a result of said quadtree partitioning is split with asymmetric partitioning that splits said fourth square leaf node resulting in a plurality of blocks that are different sizes as leaf nodes where one of said leaf nodes of said asymmetric partitioning is further split in half in either a horizontal direction or a vertical direction resulting in two blocks that are the same size as leaf nodes, defining final coding units of said coding tree unit where at least one of said final coding units is square in shape and at least one of said final coding units is rectangular in shape;

(b) wherein said bitstream is configured to includes each final coding unit, wherein said bitstream conforms to the following:

recursive asymmetric partitioning of the blocks of the coding tree unit is allowed;

recursive symmetric binary partitioning of the blocks of the coding tree unit is allowed;

a leaf node of said square parent block partitioned by said quadtree partitioning is partitionable via, any one of, selected from a group including quadtree partitioning, symmetric binary partitioning, and asymmetric partitioning;

at least one leaf node partitioned using asymmetric partitioning is not permitted to be further partitioned;

at least one leaf node partitioned using symmetric binary partitioning is not permitted to be further partitioned;

(c) identifying said final coding units to be encoded;

(d) encoding the identified final coding units in accordance with an intra encoding process.

\* \* \* \* \*